(12) United States Patent
Zhang

(10) Patent No.: US 11,395,002 B2
(45) Date of Patent: Jul. 19, 2022

(54) PREDICTION DIRECTION SELECTION METHOD AND APPARATUS IN IMAGE ENCODING, AND STORAGE MEDIUM

(71) Applicant: TENCENT TECHNOLOGY (SHENZHEN) COMPANY LIMITED, Shenzhen (CN)

(72) Inventor: Hongshun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/930,844

(22) Filed: Jul. 16, 2020

(65) Prior Publication Data
US 2020/0351518 A1    Nov. 5, 2020

Related U.S. Application Data

(63) Continuation of application No. PCT/CN2018/119185, filed on Dec. 4, 2018.

(30) Foreign Application Priority Data

Jan. 16, 2018 (CN) .......................... 201810038393.3

(51) Int. Cl.
*H04N 19/593* (2014.01)
*H04N 19/147* (2014.01)
*H04N 19/172* (2014.01)

(52) U.S. Cl.
CPC ......... *H04N 19/593* (2014.11); *H04N 19/147* (2014.11); *H04N 19/172* (2014.11)

(58) Field of Classification Search
CPC .. H04N 19/593; H04N 19/147; H04N 19/172; H04N 19/11; H04N 19/00569; H04N 7/26; G06K 9/00
See application file for complete search history.

(56) References Cited

U.S. PATENT DOCUMENTS 5,731,840 A * 3/1998 Kikuchi ................... H04N 7/52
                                                375/E7.111
2002/0001411 A1* 1/2002 Suzuki ..................... H04N 19/52
                                                375/E7.199
(Continued)

FOREIGN PATENT DOCUMENTS

CN      102665079 A     9/2012
CN      103327325 A     9/2013
(Continued)

OTHER PUBLICATIONS

Liu "Fast HEVC Intra-Prediction Mode Decision based on Conditional Selection with Hybrid Cost Ranking" 978-1-4673-9604-2 © 2015 IEEE (Year: 2015).*

(Continued)

*Primary Examiner* — Dramos Kalapodas
(74) *Attorney, Agent, or Firm* — ArentFox Schiff LLP

(57) ABSTRACT

A prediction direction selection method includes constructing, according to texture consistency of a prediction unit relative to an upper-layer coding unit of the coding unit in which the prediction unit is located, a reference direction corresponding to the prediction unit. The method also includes obtaining, for the coding unit, preliminarily selected direction vectors that are selected from intra-frame directions according to rate-distortion costs. The method next includes determining processed candidate direction vectors by using the reference direction and the preliminarily selected direction vectors. The processed candidate direction vectors are used for selecting a direction corresponding to an optimal cost as a prediction direction for unit prediction performed for the coding unit.

20 Claims, 10 Drawing Sheets

(56) References Cited

U.S. PATENT DOCUMENTS

| | | | |
|---|---|---|---|
| 2013/0170546 A1 | 7/2013 | Kim et al. | |
| 2014/0037002 A1* | 2/2014 | Sato | H04N 19/176 375/240.12 |
| 2016/0373741 A1* | 12/2016 | Zhao | H04N 19/463 |
| 2016/0373769 A1* | 12/2016 | Zhao | H04N 19/176 |
| 2016/0373782 A1* | 12/2016 | Zhao | H04N 19/136 |

FOREIGN PATENT DOCUMENTS

| | | | |
|---|---|---|---|
| CN | 103338371 A | * | 10/2013 |
| CN | 103338371 A | | 10/2013 |
| CN | 103636211 A | | 3/2014 |
| CN | 103997646 A | * | 8/2014 |
| CN | 103997646 A | | 8/2014 |
| CN | 104581152 A | | 4/2015 |
| CN | 104618726 A | | 5/2015 |
| CN | 104954788 A | | 9/2015 |
| WO | 2017113456 A | | 7/2017 |

OTHER PUBLICATIONS

Liu"FastHEVCIntra-PredictionModeDecisionbasedonConditionalSelectionwithHybridCostRanking" 978-1-4673-9604-2© 2015IEEE(Year:2015) (Year: 2015).*

Jaehwan Kim et al.,; "Fast Intra Mode Decision of HEVC Based Hierarchical Structure" ©2011 IEEE; 978-1-4577-0031-6 (Year: 2011).*

JaehwanKimet al.,;FastItraModeDecisionofHEVCBasedHierarchicalStructure?©2011IEEE;978-1-4577-0031-6(Year:2011) (Year: 2011).*

Liu FastHEVCintra-PredictionModeDecisionbasedonConditionalSelectionwithHybridCostRanking'978-1 -4673-9604-2© 2015IEEE(Year:2015)(Year:2015) (Year: 2015).*

JaehwanKimetal.,; FASTINTRAMODEDECISIONOFHEVCBASEDHIERARCHICALSTRUCTURE?©2011IEEE;978-1-4577-0031-6(Year:2011) (Year: 2011).*

Wenjun Zhao et al., "Hierarchical Structure-Based Fast Mode Decision for H.265/HEVC", 1051-8215 (c) 2015 IEEE (Year: 2015).*

Hui Fan et al.,: "iAVS2: A Fast Intra Encoding Platform for IEEE1857.4" (c)IEEE, 2018 (Year: 2018).*

International Search Report and Written Opinion dated Feb. 22, 2019 in International Application No. PCT/CN2018/119185, with English translation, citing documents AA, AO-AQ therein, 9 pages.

Japanese Office Action dated Sep. 7, 2021 in Japanese Application No. 2020-558673, with English translation, citing documents AN-AR therein. 25 pgs.

European Office Action dated Sep. 3, 2021 in European Application No. 18900650.5, citing documents AS, AN and AT, 10 pgs.

Jaehwan Kim, et al., Fast intra mode decision of HEVC based on hierarchical structure, 2011 8th International Conference on Information, Communications & Signal Processing, IEEE, Apr. 2, 2012, pp. 1-4, <URL: https://ieeexplore.ieee.org/document/6737737, DOI: 10.1109/PCS.201 3.6737737, 7 pgs.

Thaisa Leal Da Silva, et al.. HEVC intra mode decision acceleration based on tree depth levels relationship. 2013 Picture Coding Symposium (PCS), IEEE, Feb. 13, 2014, pp. 277-280. <URL: https://ieeexplore. ieee.org/document/6737737, DOI: 10.1109/PCS.2013. 6737737, 5 pgs.

Dongdong Zhang, et al., Fast intra mode decision for HEVC based on texture characteristic from RMD and MPM, 2014 IEEE Visual Communications and Image Processing Conference, IEEE, Mar. 2, 2015, pp. 510-513, URL: https://ieeexplore.ieee.org/document/ 7051618, DOI: 10.1109/VCIP.2014.7051618, 7 pgs.

Thaisa Leal Da Silva, et al. HEVC intra prediction acceleration based on texture direction and prediction unit modes reuse, SIP (2014), Cambridge University Press, Dec. 5, 2014. vol. 3, e13. pp. 1-13. URL: https://www.cambridge.org/core/journals/apsipa-transactions-on-signal-andinformation-processing/article/hevc-intra-prediction-acceleration-based-on-texture-direction-and-prediction-unit-modes-reuse/430556D47EE1FFABD2646100FBE85A36. DOI: https://doi.org/10.1017/ATSIP.2014.14, 13 pg.

Liang Zhao, et al. Further Encoder Improvement of intra mode decision ,Joint Collaborative Team on Video Coding (JCT-VC) of ITU-T SG16 WP3 and ISO/IEC JTC1/SC29/G11 4th Meeting: Daegu, KR, Jan. 20-28, 2011, [JCTVC-D283], JCTVC-D283 (version 3), ITU-T, Jan. 22, 2011, JCTVC-D283-v3.zip: JCTVC-D283. doc: pp. 1-4, 7 pgs.

Wenjun Zhao Wenjun et al, Hierarchical Structure-Based Fast Mode Decision for H.265/HEVC. IEEE Transactions on Circuits and Systems for Video Technology, IEEE, US, vol. 25, No. 10. Oct. 1, 2015 (Oct. 1, 2015), pp. 1651-1664, XP011670560, ISSN: 1051-8215, DOI: 10.1109/TCSVT. 2015.2395751 [retrieved on Sep. 30, 2015], 14 pgs.

Kui Fan et al, iAVS2: A Fast Intra Encoding Platform for IEEE1857. 4, 2016 Visual Communications and Image Processing (VCIP), vol. 27, No. 12, Nov. 1, 2016 (Nov. 1, 2016), pp. 2726-2738, XP055415182, DOI: 10.1109/TCSVT.2016.2595327 ISBN: 978-1-5090-5316-2, 12 pgs.

Chinese Office Action in 201810038393.3, dated May 25, 2022, 11 pages with Concise English Translation.

* cited by examiner

PREDICTION DIRECTION SELECTION METHOD AND APPARATUS IN IMAGE ENCODING, AND STORAGE MEDIUM

RELATED APPLICATION

This application is a continuation of International Application No. PCT/CN2018/119185, filed on Dec. 4, 2018, which claims priority to Chinese Patent Application No. 201810038393.3, entitled "PREDICTION DIRECTION SELECTION METHOD AND APPARATUS IN IMAGE ENCODING, AND STORAGE MEDIUM" and filed on Jan. 16, 2018. The entire disclosures of the prior applications are hereby incorporated by reference in their entirety.

FIELD OF THE TECHNOLOGY

The present disclosure relates to the field of video encoding technologies, and in particular, to a prediction direction selection method and apparatus in image encoding, and a computer-readable storage medium.

BACKGROUND OF THE DISCLOSURE

In daily work and life, needs for image encoding in videos are rapidly increasing, and the pursuit of enjoyment from images with higher definition never stops. Image compression is implemented by performing image encoding, so that display pictures with higher resolution can be provided in the same network bandwidth conditions.

Implementation of image encoding is also continuously evolving over time. However, H.264 (a highly compressed digital video codec standard), which is currently popular, has some limitations in principle, and cannot adapt to future needs. Therefore, a new standard, namely, the High Efficiency Video Coding (HEVC) coding protocol, has emerged.

However, in actual image encoding implementation, because the HEVC coding protocol is excessively complex and has relatively high requirements on encoding apparatus performance, an ordinary encoding apparatus still cannot achieve a real-time encoding capability. Consequently, application of the HEVC coding protocol to image encoding is severely limited.

Specifically, image encoding implemented by using the HEVC coding protocol includes two parts: encoding prediction and code compression. During encoding prediction, quadtree division needs to be performed on a coding unit (CU) layer by layer. On each layer, the CU traverses, for a prediction unit (PU), 35 prediction directions specified by the HEVC coding protocol, and selects prediction directions from the 35 prediction directions as optimal directions that are predicted, to obtain corresponding prediction modes. Herein, the CU performs encoding prediction on the PU in the obtained prediction modes.

The prediction direction selection is implemented through two steps, that is: a first step serves as preliminary selection, in which a sum of absolute transformed differences (SATD) is used as a rate-distortion function. The 35 prediction directions are first traversed by using the rate-distortion function, to obtain rate-distortion costs of, for example, all prediction directions. The prediction directions are sorted in ascending order according to the rate-distortion costs, and then prediction directions corresponding to the few lowers rate-distortion costs are obtained and are combined with most probable mode (MPM) candidate directions into new candidate directions. A second step serves as accurate selection, in which a sum of squared differences (SSD) is used as the rate-distortion function, the candidate directions formed in the first step are traversed and calculated by using the rate-distortion function. Then directions having minimum rate-distortion costs are found as the optimal directions that are predicted. To implement prediction direction selection, reconstruction needs to be performed, resulting in high complexity and a low execution speed.

The HEVC coding protocol is merely a standard, and includes an official implementation, HEVC Test Model (HM), and a fork implementation, x265, when implemented in code. During the optimal direction prediction, using the HM as an example, in a case that new candidate directions are obtained through combination, top N directions in preliminary selection results are obtained, and a value of N is related to a size of a PU on which the CU performs prediction. For example, in a case that a size of a PU is 64×64 pixel blocks, 32×32 pixel blocks, or 16×16 pixel blocks, a value of N is 3; and in a case that a size of a PU is 8×8 pixel blocks or 4×4 pixel blocks, a value of N is 8. x265 is similar to the above.

Therefore, in a case that a size of a PU is 8×8 pixel blocks or 4×4 pixel blocks, plus an optimal direction that is obtained through prediction performed by an adjacent PU on the left and an optimal direction that is obtained through prediction performed by an adjacent PU on the top that are included in the MPM candidate directions, there are at least 10 optimal directions obtained through encoding prediction performed on the PU by the CU. For subsequent code compression, the quantity is still large, and accuracy cannot be ensured, resulting in a low corresponding encoding speed and a poor effect.

In other words, in the HEVC coding protocol, to implement optimal selection for the prediction directions during implementation of the prediction direction selection, there is a limitation that an optimal direction obtained through prediction is not accurate. Consequently, them is a severe performance defect in image encoding.

SUMMARY

To resolve a technical problem in the related art that it is difficult to ensure accuracy of prediction direction selection during unit prediction performed by a CU, resulting in severe performance defects in image encoding, the present disclosure provides a prediction direction selection method and apparatus in image encoding, and a computer-readable storage medium.

In an embodiment, a prediction direction selection method in image encoding includes determining, in encoding prediction initiated for a prediction unit of a coding unit, a reference direction corresponding to the prediction unit according to texture consistency of the prediction unit relative to an upper-layer coding unit of the coding unit in which the prediction unit is located. The method also includes obtaining, for the coding unit, preliminarily selected direction vectors that are selected from intra-frame directions according to rate-distortion costs, and determining, by processing circuitry of an information processing apparatus, processed candidate direction vectors by using the reference direction and the preliminarily selected direction vectors. The processed candidate direction vectors being used for selecting a direction corresponding to a minimal cost as a prediction direction for unit prediction performed for the coding unit.

In an embodiment, the obtaining includes selecting, among 35 intra-frame directions defined in High Efficiency Video Coding (HEVC) standard, two or more intra-frame directions having smallest rate-distortion costs according to rate-distortion costs in the prediction unit.

In an embodiment, after the determining the processed candidate direction vectors by using the reference direction and the preliminarily selected direction vectors, the method includes modifying a quantity of the preliminarily selected direction vectors in the processed candidate direction vectors according to the reference direction and the intra-frame directions and adjusting the processed candidate direction vectors including the modified quantity of the preliminarily selected direction vectors.

In an embodiment, the determining the reference direction includes obtaining depth information of the coding unit, locating the upper-layer coding unit of the coding unit according to the depth information, and extracting, from the upper-layer coding unit, a prediction direction obtained through prediction completed for a prediction unit existing in the upper-layer coding unit. The determining the reference direction also includes determining, by using the prediction direction, the reference direction for performing the encoding prediction on the prediction unit.

In an embodiment, the extracting includes extracting, as the prediction direction, a prediction direction obtained through encoding prediction that is performed on a prediction unit of the upper-layer coding unit.

In an embodiment, the extracting includes determining adjacent coding units that are located at a same depth as the coding unit and correspond to the upper-layer coding unit, and extracting obtained prediction directions according to the adjacent coding units.

In an embodiment, the adjacent coding units include a coding unit located on top of the coding unit, a coding unit located left of the coding unit, and a coding unit located on top left of the coding unit.

In an embodiment, the obtaining includes obtaining, according to rate-distortion costs of the intra-frame directions, a specified quantity of the intra-frame directions arranged in ascending order according to corresponding rate-distortion costs, the specified quantity being related to a size corresponding to the prediction unit.

In an embodiment, the specified quantity separately corresponds to a specific value according to the size corresponding to the prediction unit, and as the size corresponding to the prediction unit decreases, the specified quantity of the intra-frame directions gradually increases until a maximum value is reached.

In an embodiment, before the determining the processed candidate direction vectors, the method includes obtaining most probable mode (MPM) candidate directions of the prediction unit, the MPM candidate directions being used for determining the processed candidate direction vectors of the prediction unit together with the reference direction and the preliminarily selected direction vectors.

In an embodiment, the modifying the quantity of the preliminarily selected direction vectors includes generating, in the processed candidate direction vectors including preliminarily selected direction vectors having a same direction as other candidate direction vectors in the processed candidate direction vectors, the modified quantity of the preliminarily selected direction vectors and generating accurate-selection adjustment control information corresponding to adjustment of the processed candidate direction vectors. The modifying the quantity of the preliminarily selected direction vectors further includes retaining, in the processed candidate direction vectors, a quantity of the preliminarily selected direction vectors conforming to the modified quantity of the preliminarily selected direction vectors and that have smallest rate-distortion costs. Finally, the modifying the quantity of the preliminarily selected direction vectors includes controlling, according to the accurate-selection adjustment control information, retaining or removing of the other candidate direction vectors in the processed candidate direction vectors, to obtain the processed candidate direction vectors after accurate-selection adjustment.

In an embodiment, the other candidate direction vectors in the processed candidate direction vectors include the reference direction and most probable mode (MPM) candidate directions. The generating the modified quantity of the preliminarily selected direction vectors and the generating the accurate-selection adjustment control information includes identifying preliminarily selected direction vectors that are in the processed candidate direction vectors and that have a same direction as the reference direction and/or the MPM candidate directions. The method further includes decreasing a current quantity of preliminarily selected direction vectors in the processed candidate direction vectors according to the identified preliminarily selected direction vectors, to obtain the modified quantity of the preliminarily selected direction vectors, the modified quantity of the preliminarily selected direction vectors corresponding to a ranking of rate-distortion costs corresponding to the identified preliminarily selected direction vectors in ascending order. Finally, the method includes generating the accurate-selection adjustment control information indicating use of only the preliminarily selected direction vectors whose quantity is modified in a case that the identified preliminarily selected direction vectors have a same direction as both the reference direction and the MPM candidate directions, or generating the accurate-selection adjustment control information indicating use of the reference direction, the MPM candidate directions, and the preliminarily selected direction vectors whose quantity is modified in a case that the identified preliminarily selected direction vectors have a same direction as the reference direction or the MPM candidate directions.

In an embodiment, the other candidate direction vectors include the reference direction and the MPM candidate directions. The generating the modified quantity of the preliminarily selected direction vectors and the generating the accurate-selection adjustment control information further includes generating the accurate-selection adjustment control information indicating use of the reference direction, the MPM candidate directions, and the preliminarily selected direction vectors whose quantity is not modified in a case that none of the preliminarily selected direction vectors have a same direction as the reference direction or the MPM candidate directions.

In an embodiment, the controlling, according to the accurate-selection adjustment control information, the retaining or removing of the other candidate direction vectors includes retaining or removing the reference direction and the MPM candidate directions in the processed candidate direction vectors according to the accurate-selection adjustment control information, to form the processed candidate direction vectors after the accurate-selection adjustment.

In an embodiment, the rate-distortion costs are obtained by using a sum of absolute transformed differences (STAD) rate-distortion cost function.

In an embodiment, a prediction direction selection apparatus includes processing circuitry configured to determine, in encoding prediction initiated for a prediction unit of a coding unit, a reference direction corresponding to the prediction unit according to texture consistency of the prediction unit relative to an upper-layer coding unit of the coding unit in which the prediction unit is located. The processing circuitry is further configured to obtain, for the coding unit, preliminarily selected direction vectors that are selected from intra-frame directions according to rate-distortion costs. Finally, the processing circuitry is configured to determine processed candidate direction vectors by using the reference direction and the preliminarily selected direction vectors. The processed candidate direction vectors being used for selecting a direction corresponding to a minimal cost as a prediction direction for unit prediction performed for the coding unit.

In an embodiment, the processing circuitry is further configured to modify a quantity of the preliminarily selected direction vectors in the processed candidate direction vectors according to the reference direction and the intra-frame directions and adjusting the processed candidate direction vectors including the modified quantity of the preliminarily selected direction vectors.

In an embodiment, the rate-distortion costs are obtained by using a sum of absolute transformed differences (STAD) rate-distortion cost function.

In an embodiment, an electronic device includes a processor and a memory, the memory storing computer-readable instructions, and the computer-readable instructions, when executed by the processor, performing any of the previously described methods.

In an embodiment, a non-transitory computer-readable storage medium, storing instructions, which when executed by at least one processor, cause the at least one processor to perform determining, in encoding prediction initiated for a prediction unit of a coding unit, a reference direction corresponding to the prediction unit according to texture consistency of the prediction unit relative to an upper-layer coding unit of the coding unit in which the prediction unit is located. The instructions cause the at least one processor to further perform obtaining, for the coding unit, preliminarily selected direction vectors that are selected from intra-frame directions according to rate-distortion costs. Finally, the instructions cause the at least one processor to perform determining processed candidate direction vectors by using the reference direction and the preliminarily selected direction vectors. The processed candidate direction vectors being used for selecting a direction corresponding to a minimal cost as a prediction direction for unit prediction performed for the coding unit.

The technical solutions provided in the embodiments of the present disclosure may include the following beneficial effects:

In encoding prediction initiated for a PU of a CU, a reference direction corresponding to the PU is first determined according to texture consistency of the PU relative an upper-layer CU of the CU in which the PU is located. Then preliminarily selected direction vectors that are formed from intra-frame directions according to rate-distortion costs are obtained for the CU. Finally, intra-frame directions of accurately selected candidate direction vectors (or processed candidate direction vectors) are determined by using the reference direction and the preliminarily selected direction vectors. The accurately selected candidate direction vectors are used for selecting a direction corresponding to a minimal cost as a prediction direction for unit prediction performed for the CU. In this way, the PU obtains the reference direction according to the texture consistency of the upper-layer CU, and the PU, as an image area, has approximately the same texture direction as that of an image area corresponding to the upper-layer CU and an adjacent PU. Therefore, introduction of the reference direction can effectively narrow a selection range of prediction directions for selection of the prediction directions, thereby ensuring accuracy of accurately selected candidate direction vectors on which selection (e.g., selection of an optimal prediction direction) can be subsequently performed and ensuring efficiency of the encoding prediction. In addition, the preliminarily selected direction vectors formed from the intra-frame directions according to the rate-distortion costs are used as preliminary-selection prediction results, thereby effectively reducing computational complexity. With the assistance of the foregoing reference direction, a probability that the obtained accurately selected candidate directions include a prediction direction selected for use in unit prediction in the coding unit (e.g., an optimal direction) is highest. Accuracy of prediction direction selection during unit prediction performed for the CU is ensured, thereby effectively improving image encoding performance.

It is to be understood that the above general descriptions and the following detailed descriptions are merely exemplary, and cannot limit the present disclosure.

BRIEF DESCRIPTION OF THE DRAWINGS

The accompanying drawings herein, which are incorporated into the specification and constitute a part of this specification, illustrate embodiments consistent with the present disclosure and, together with the specification, serve to explain the principles of the present disclosure.

DESCRIPTION OF EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. Implementations described in the following exemplary embodiments do not represent all implementations consistent with the present disclosure. On the contrary, the implementations described in the following exemplary embodiments are merely examples of apparatuses and methods consistent with some aspect of the present disclosure, as described in detail in the appended claims.

Figure 1:
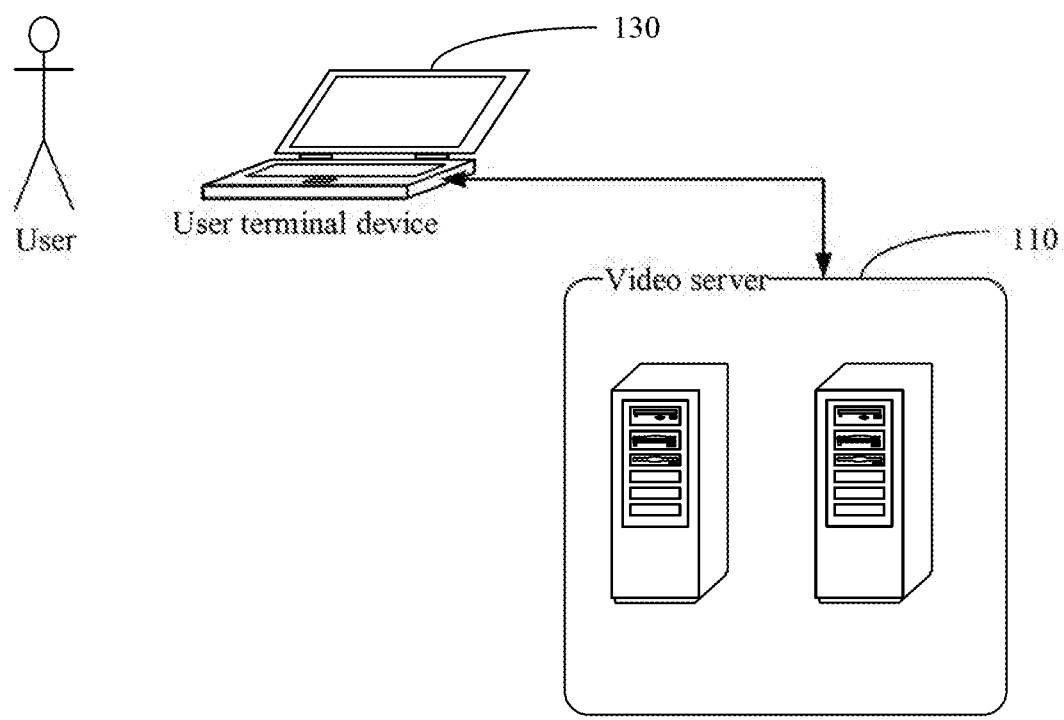
FIG. 1 is a schematic diagram of an implementation environment included in the present disclosure according to an exemplary embodiment.

FIG. 1 is a schematic diagram of an implementation environment included in the present disclosure according to an exemplary embodiment. In an exemplary embodiment, as shown in FIG. 1, the implementation environment included in the present disclosure is a video server 110 and a user terminal device 130.

The video server 110 is configured to provide a video application service, to enable the user terminal device 130 accessing the video server 110 to run the video application service.

In this case, the video server 110 performs encoding prediction and code compression through prediction direction selection implemented in the present disclosure, obtains a bitstream corresponding to a video sequence, performs video transmission to the user terminal device 130, and further, after decoding encoded video data having high definition and a high compression rate, displays an image having high definition in the video application service run by the user terminal device 130.

In addition to the video server 110 performing video encoding, the implementation environment included in the present disclosure further includes a device performing video transmission to the user terminal device 130, for example, another user terminal device, and the user terminal devices are not listed one by one herein.

Figure 2:
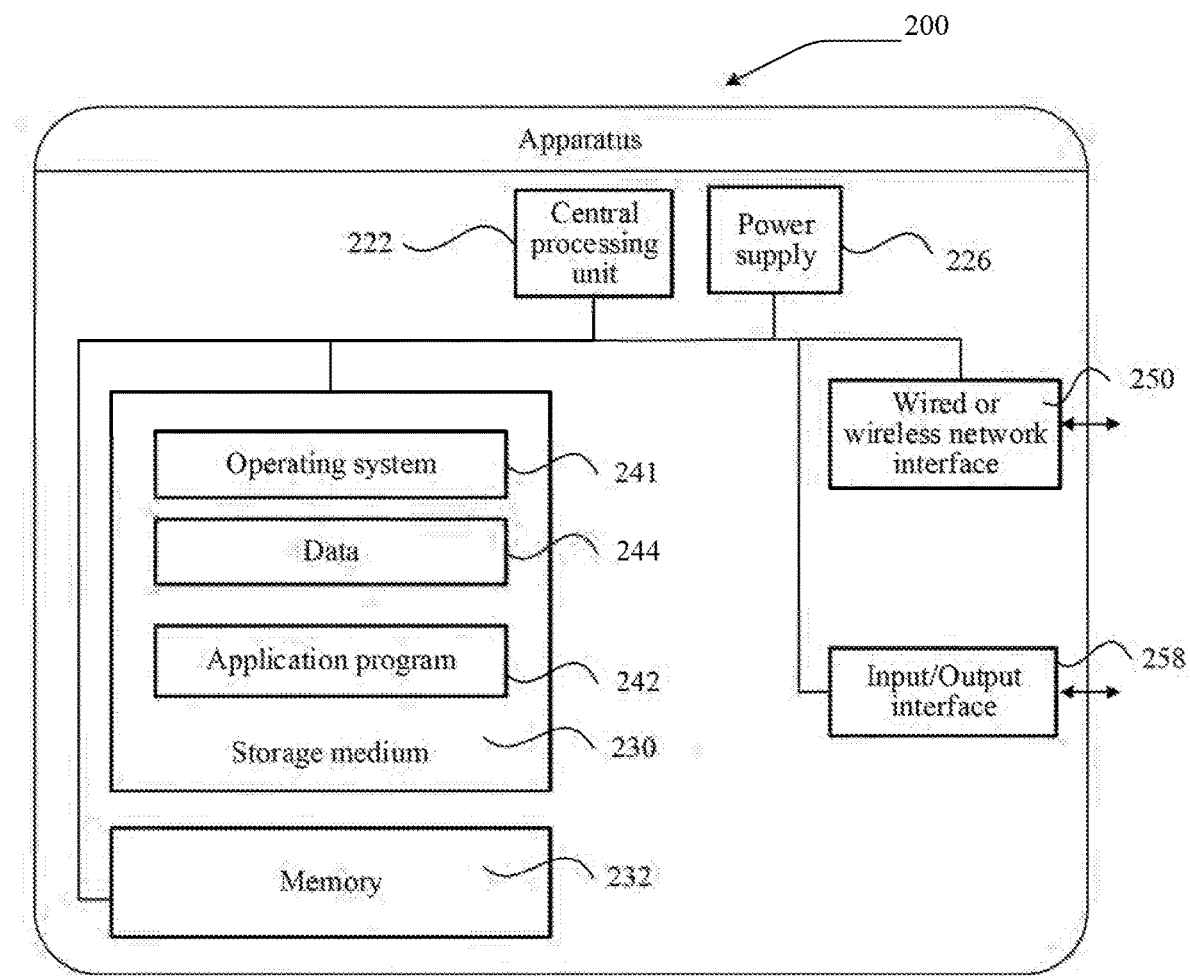
FIG. 2 is a block diagram of an apparatus according to an exemplary embodiment.

FIG. 2 is a block diagram of an apparatus according to an exemplary embodiment. For example, the apparatus 200 may be a video server shown in FIG. 1.

Referring to FIG. 2, the apparatus 200 may have different configurations or performance, and may include one or more central processing units (CPUs) 222 (for example, one or more processors or processing circuitry), a memory 232, and one or more storage media 230 (for example, one or more mass storage devices) that store an application program 242 or data 244. The memory 232 and the storage medium 230 may perform transient storage or permanent storage. The programs stored in the storage media 230 may include one or more modules (not shown in the figure), and each module may include a series of instruction operations on the server. Further, the CPU 222 may be configured to: communicate with the storage medium 230, and perform, on the apparatus 200, the series of instruction operations in the storage medium 230. The apparatus 200 may further include one or more power supplies 226, one or more wired or wireless network interfaces 250, one or more input/output interfaces 258, and/or one or more operating systems 241, for example, Windows Server™, Mac OS X™, Unix™, Linux™, or FreeBSD™. Steps performed by the video server in the embodiments described below in FIG. 3, FIG. 4, FIG. 5, FIG. 6, and FIG. 7 may be based on an apparatus structure shown in FIG. 2.

Figure 3:
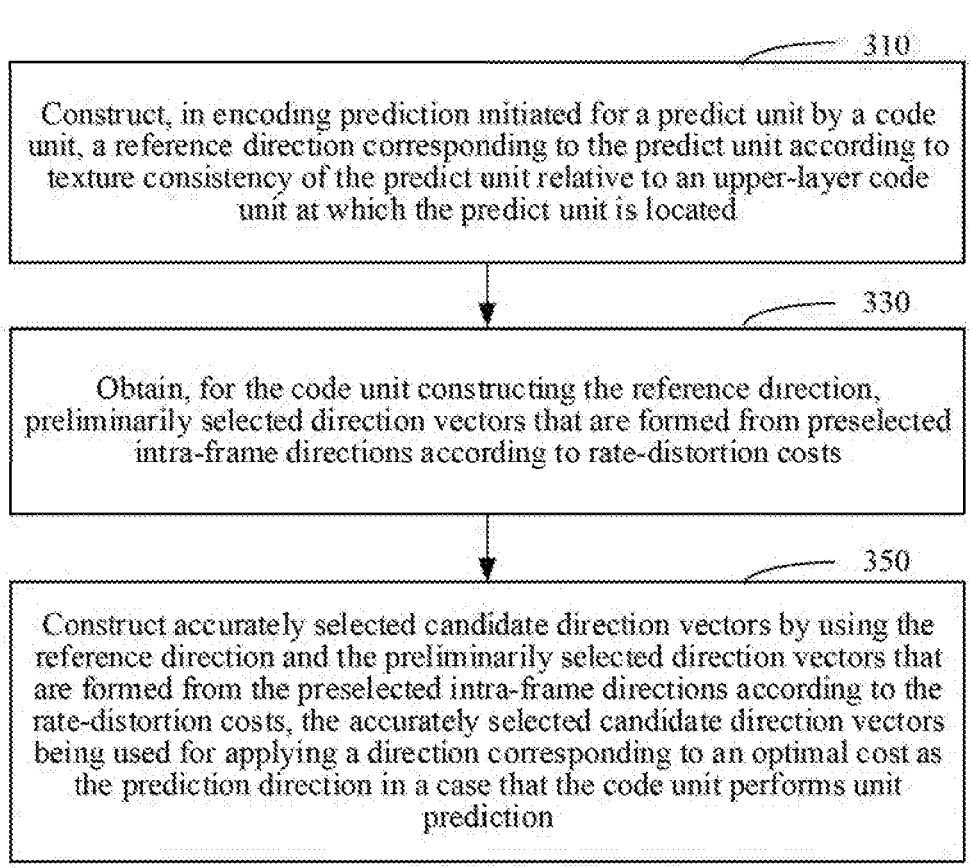
FIG. 3 is a flowchart of a prediction direction selection method in image encoding according to an exemplary embodiment.

FIG. 3 is a flowchart of a prediction direction selection method in image encoding according to an exemplary embodiment. The prediction direction selection method in image encoding is applicable to the video server 110 in the foregoing implementation environment, or another user terminal device. The video server 110 may be the apparatus shown in FIG. 2 in an exemplary embodiment.

As shown in FIG. 3, the prediction direction selection method in image encoding at least includes the following steps.

Step 310. Construct, in encoding prediction initiated for a PU by a CU, a reference direction corresponding to the PU according to texture consistency of the PU relative to an upper-layer CU at which the PU is located. In an exemplary embodiment, step 310 may include determining, in encoding prediction initiated for a prediction unit of a coding unit, a reference direction corresponding to the prediction unit according to texture consistency of the prediction unit relative to an upper-layer coding unit of the coding unit in which the prediction unit is located.

An image on which prediction direction selection is performed and further encoding is completed is an I-frame in a video sequence, also referred to as an intra-coded frame, may be image code, or may be any image that needs to be intra-coded, and is not limited herein.

Intra-frame coding performed on the I-frame or image code is independent encoding performed without a reference image. It is to be understood that a first frame of image in a video sequence is usually an I-frame. In video transmission, if a transmitted bitstream is damaged, the I-frame is usually used as a starting point of a video. Specifically, the I-frame is used for fast-forward, playback, monitoring a change of a video scenario, and other functions that are in the video application service and that are implemented through video transmission. However, in this way, more bandwidth consumption will certainly be caused. Therefore, it is necessary to reduce bandwidth consumption as much as possible through the image encoding performed in the present disclosure, to obtain an optimal image effect. That is, because the I-frame represents an entire frame of image without generating an artifact, optimal picture quality can be obtained.

In the HEVC coding protocol, before an encoder performs intra prediction or inter prediction, an image is first cut into CUs independent of each other. Specifically, during intra prediction, quadtree division is performed on a largest CU of 64×64 pixel blocks, where a division depth is consistent to set depth information, to further form several layers of CUs.

As the division depth at which the quadtree division is performed continuously increases, a CU on a layer corresponding to the division depth continuously decreases in size until division is performed at a maximum division depth indicated by the depth information, and a smallest CU on a layer corresponding to the maximum division depth is obtained.

A CU has an associated PU. Encoding prediction of the CU is performed for the associated PU, and code compression that is performed after the encoding prediction is completed is performed on a transform unit (TU) associated with the CU.

A CU corresponding to any layer needs to initiate encoding prediction for an associated PU.

In conclusion, CUs include a largest CU and CUs of other sizes, and to improve flexibility of sizes of the CUs, the CUs are set to have different sizes, to adapt to different depths. The image encoding is performed by using a CU as a unit. The CU performs encoding prediction on a PU divided by the CU, and performs code compression on a TU divided by the CU. For example, encoding prediction is performed on PUs which make up a CU and code compression is performed on TUs which make up the CU.

With regard to the CUs obtained through quadtree division layer by layer in an image, internal texture of the largest CU is usually very complex, and a relatively large residual error may be generated if prediction is directly performed. Therefore, quadtree division needs to be continuously performed. As division is performed layer by layer, a CU obtained ater division has a smaller size and simpler texture, and is applicable to prediction in a next step.

Several CUs are distributed in the image, and image encoding is performed on the CUs independently and synchronously. In this way, an encoding speed can be ensured and even be improved.

Because the CUs are obtained through division layer by layer within the largest CU, for example, quadtree division is performed on a CU to obtain four CUs corresponding to a lower layer, the four CUs on the lower layer and an upper-layer CU possess consistency in texture features, and a reference direction corresponding to a PU is constructed, according to the possessed texture consistency, for encoding prediction performed on the CU.

The reference direction that is accurately obtained according to the texture consistency is used as a prediction direction existing in the image encoding, and provides assistance and reference for performing subsequent prediction for an optimal direction. In this way, a foundation is laid for really selecting the optimal direction in subsequent prediction direction selection.

Step 330. Obtain, for the CU constructing the reference direction, preliminarily selected direction vectors that are formed from preselected intra-frame directions according to rate-distortion costs. In an exemplary embodiment, step 330 may include obtaining, for the coding unit, preliminarily selected direction vectors that are selected from intra-frame directions according to rate-distortion costs.

The preliminarily selected direction vectors are directions preliminarily selected from 35 preselected intra-frame directions in the HEVC coding protocol according to rate-distortion costs, and a quantity of the preliminarily selected direction vectors depends on a size of the PU. In an exemplary embodiment, the used rate-distortion costs are obtained through calculation by using an SATD (sum of absolute transformed differences) rate-distortion cost function. It is to be understood that, for a preselected intra-frame direction, if a rate-distortion cost corresponding to the preselected intra-frame direction is smaller, then a possibility that the preselected intra-frame direction becomes a predicted optimal direction is higher.

In encoding prediction performed on the CU, preliminarily selected direction vectors including several preselected intra-frame directions having minimum rate-distortion costs are formed according to rate-distortion costs in the PU that respectively correspond to 35 preselected intra-frame directions in an HEVC coding protocol.

In this exemplary embodiment, preliminary selection of prediction directions required for performing encoding prediction on the PU of the CU in the image is implemented.

Step 350. Construct the accurately selected candidate direction vectors (or processed candidate direction vectors) by using the reference direction and the preliminarily selected direction vectors that are formed from the preselected intra-frame directions according to the rate-distortion costs, the accurately selected candidate direction vectors being used for applying a direction corresponding to an optimal cost as the prediction direction in a case that the CU performs unit prediction. In an exemplary embodiment, step 330 may include determining, by processing circuitry of an information processing apparatus, accurately selected candidate direction vectors by using the reference direction and the preliminarily selected direction vectors.

In encoding prediction of the PU, accurately selected candidate direction vectors corresponding to the PU are determined by using the reference direction and the preliminarily selected direction vectors that are constructed through step 310, to obtain accurately selected candidate direction vectors including the reference direction and the preliminarily selected direction vectors.

The accurately selected candidate direction vectors include several directions, and are used as a direction candidate set of directions included in optimal results in the encoding prediction of the PU. Optimal directions required for encoding prediction exist in the accurately selected candidate direction vectors.

Certainly, in addition to the reference direction and the preliminarily selected direction vectors, the accurately selected candidate direction vectors may further include MPM candidate directions corresponding to the PU.

Correspondingly, in another exemplary embodiment, before step 330, the prediction direction selection method in image encoding further includes:

obtaining MPM candidate directions of the PU, the MPM candidate directions being used for constructing the accurately selected candidate direction vectors of the PU together with the reference direction and the preliminarily selected direction vectors. In an exemplary embodiment, this includes obtaining MPM candidate directions of the prediction unit, the MPM candidate directions being used for determining the accurately selected candidate direction vectors of the prediction unit together with the reference direction and the preliminarily selected direction vectors.

In this way, when the accurately selected candidate direction vectors are determined, the MPM candidate directions of the PU, the foregoing reference direction, and the foregoing preliminarily selected direction vectors jointly form the accurately selected candidate direction vectors.

Specifically, the MPM candidate directions, also referred to as most probable candidate directions, provide three most probable preselected intra-frame directions for performing of the encoding prediction in the PU, that is, the top, the left, and the top left. Determination of the accurately selected candidate direction vectors is extended to the MPM candidate directions, to further expand factors in encoding prediction, thereby preventing a direction from being omitted from the accurately selected candidate direction vectors.

In another exemplary embodiment, after step 350, the prediction direction selection method in image encoding further includes:

modifying a quantity of preliminarily selected direction vectors in the accurately selected candidate direction vectors according to the reference direction and the preselected intra-frame directions and adjusting accurately selected candidate direction vectors including the modified quantity of preliminarily selected direction vectors. In an exemplary embodiment, this includes modifying a quantity of the preliminarily selected direction vectors in the accurately selected candidate direction vectors according to the reference direction and the intra-frame directions and adjusting the accurately selected candidate direction vectors including the modified quantity of the preliminarily selected direction vectors.

As described above, the accurately selected candidate direction vectors are constructed through step 310 to step 350. Afterward, a quantity of the preliminarily selected direction vectors included in the accurately selected candidate direction vectors needs to be modified, and adjustment is performed on other types of directions based on the included preliminarily selected direction vectors, to ensure that the optimal direction can be included in the accurately selected candidate direction vectors. In addition, the quantity of the accurately selected candidate direction vectors is decreased, to ensure an encoding speed.

It is to be understood that the accurately selected candidate direction vectors are obtained through construction according to different dimensions such as the reference direction based on the texture consistency, the preliminarily selected direction vectors, and even the MPM candidate directions. In the constructed accurately selected candidate direction vectors, although the various types of directions correspond to different dimensions, it is necessary to perform modification on the preliminarily selected direction vectors with assistance of the reference direction and the MPM candidate directions. Correspondingly, it is necessary to use the modified preliminarily selected direction vectors to perform adjustment on the reference direction and the MPM candidate directions in the accurately selected candidate direction vectors, thereby further narrowing a range of optimal direction selection in subsequent encoding prediction, and improving efficiency and accuracy of the prediction direction selection.

For example, in the preliminarily selected direction vectors, for a preselected intra-frame direction corresponding to top1 having the minimum rate-distortion cost, a same direction as the preselected intra-frame direction corresponding to top1 exists in the reference direction and/or MPM candidate directions of the accurately selected candidate direction vectors. In this case, the existence of the same direction is used as a basis for modifying preliminarily selected direction vectors included in the accurately selected candidate direction vectors. In addition, the case that the preselected intra-frame direction corresponding to top1 exists in the reference direction and/or the MPM candidate directions, for example, may mean that the same direction exists both in the reference direction and the MPM candidate directions, indicating that the reference direction, the MPM candidate directions, and the preliminarily selected direction vectors all indicate that the preselected intra-frame direction corresponding to top1 is the optimal direction. In other words, a possibility that the preselected intra-frame direction corresponding to top1 is the optimal direction is quite high. Then, during adjustment of the accurately selected candidate direction vectors, merely the preselected intra-frame direction corresponding to top1 needs to be retained.

For another example, if the same direction merely exists in the reference direction or the MPM candidate directions, then during modification performed on the preliminarily selected direction vectors, the preliminarily selected direction vectors existing in the accurately selected candidate direction vectors after modification constitute the adjusted accurately selected candidate direction vectors together with the reference direction and the MPM candidate directions.

Direction processing in the accurately selected candidate direction vectors according to existing repeated directions includes: modifying a quantity of the selected preliminarily selected direction vectors, to control the quantity of the preliminarily selected direction vectors in the accurately selected candidate direction vectors, and further includes: generating accurate-selection adjustment control information specifying whether to perform adjustment on the other types of directions (for example the reference direction and the MPM candidate directions) in the accurately selected candidate direction vectors and how to perform adjustment.

After the modification and the adjustment are completed, a direction selection range of the optimal selection for prediction directions can be narrowed, and a quantity of directions included in the accurately selected candidate direction vectors and accuracy and reliability of the optimal direction prediction are controllable. In addition, both an encoding speed and an image effect are considered, so that a case in which one of the encoding speed and the image effect is degraded is avoided.

Prediction direction selection of a PU is performed in CUs of all the layers in the image, then an entire encoding prediction process is completed, and accordingly, encoding prediction for the entire image is completed.

In actual image encoding implementation, usually, because the HEVC coding protocol is excessively complex and has high requirements on performance of encoding apparatus, an ordinary encoding apparatus still cannot achieve a real-time encoding capability. Consequently, application of the HEVC coding protocol to image encoding is severely limited.

In the foregoing exemplary embodiments, in addition to improvement of the accuracy of prediction on the optimal direction, a quantity of directions included in optimal results obtained through the encoding prediction can be greatly decreased, and then the encoding speed is improved. Not only the accuracy of prediction is ensured, but also the encoding speed is greatly improved, so that real-time encoding can be implemented in an ordinary encoding apparatus, and a cause of an application limitation of the HEVC coding protocol in image encoding is eliminated.

In this way, through the foregoing exemplary embodiments, real-time encoding and a video application service having high definition can be implemented for a user, and costs for storage and distribution of display are reduced, thereby paving the way for contents having higher definition to enter a consumer level.

Figure 4:
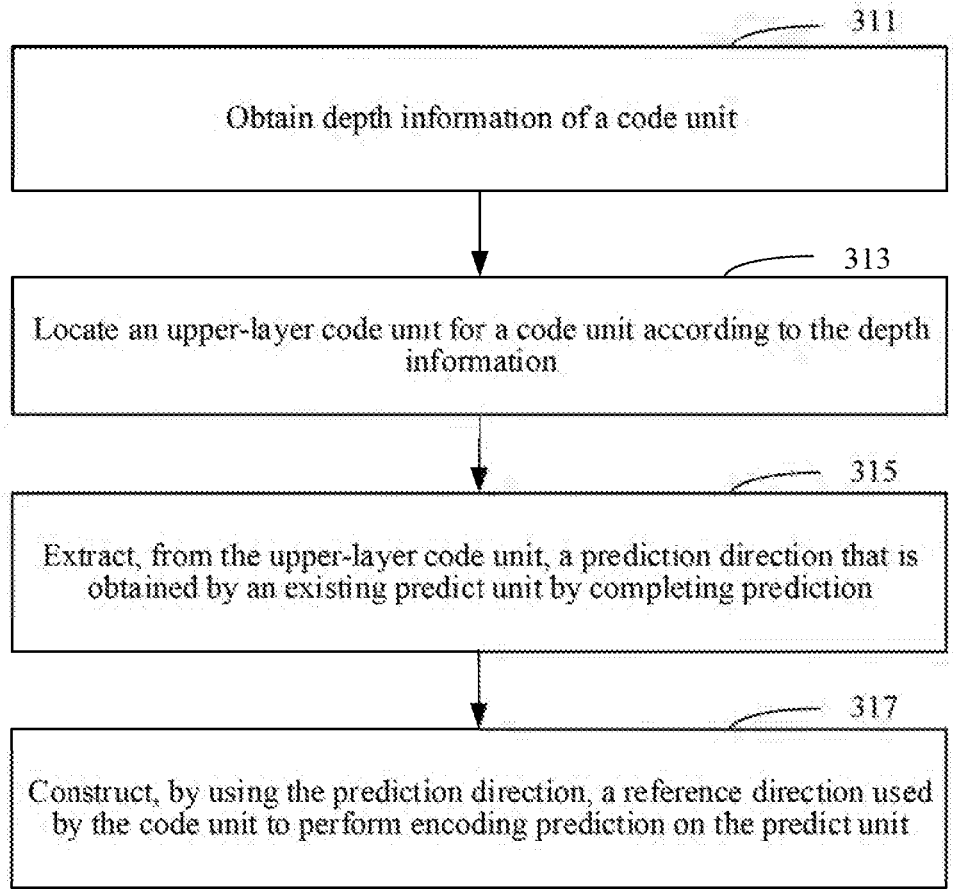
FIG. 4 is a flowchart describing details of step 310 according to the embodiment corresponding to FIG. 3.

FIG. 4 is a flowchart describing details of step 310 according to the embodiment corresponding to FIG. 3. Step 310, as shown in FIG. 4, at least includes the following steps.

Step 311. Obtain depth information of a CU.

As described above, the CU is obtained through quadtree division performed in an image. For the image, there is a corresponding CU at each depth. Therefore, in image encoding that is performed by using a CU as a unit, to implement prediction direction selection, corresponding depth information is first obtained.

The obtained depth information of the CU indicates a depth at which the CU is located.

Step 313. Locate an upper-layer CU for the CU according to the depth information.

The depth information indicates a specific value, for example a value between 0 and 3, and each CU has unique corresponding depth information. For a CU initiating encoding prediction of a PU, an upper-layer CU of the CU is determined according to depth information corresponding to the CU, depth information corresponding to other CUs, and mapping of respective locations of the CU and the other CUs in the image.

Step 315. Extract, from the upper-layer CU, a prediction direction that is obtained by an existing PU by completing prediction. In an exemplary embodiment, step 315 includes extracting, from the upper-layer coding unit, a prediction direction obtained through prediction completed for a prediction unit existing in the upper-layer coding unit.

It is to be understood that the CU initiating encoding prediction of the PU is obtained through division on the upper-layer CU. For the quadtree division performed on the upper-layer CU, in addition to the CU that is currently referred to, other CUs are further obtained through division on the upper-layer CU.

Therefore, a prediction direction corresponding to encoding prediction performed in the CU of the PU is obtained according to the upper-layer CU and the other CUs.

Execution of the process provides, in a dimension of texture consistency, an optimal prediction direction for the CU to perform encoding prediction in the PU.

The PU initiating the encoding prediction and the upper-layer CU have a feature of texture consistency. The CU at which the PU is located corresponds to the upper-layer CU. The PU is a part of a CU obtained through quadtree division performed on the upper-layer CU. Because the CU is from the upper-layer CU, the CU also has texture consistency with the upper-layer CU.

Through the quadtree division performed on the upper-layer CU, in addition to the CU that is currently referred to, other CUs are also obtained. Because the CU that is currently referred to and the other CUs are all from the upper-layer CU, the CU that is currently referred to and the other CUs also have texture consistency.

Based on this, a direction determined through encoding prediction that is completed for a PU associated with the upper-layer CU and/or PUs associated with the other CUs is used as an optimal direction predicted for the current PU, and the direction is used as reference for accurately selecting a prediction direction to form an optimal result of encoding prediction completed for the PU.

In an exemplary embodiment, step 315 at least includes: extracting a prediction direction that is obtained through prediction that is performed on a PU of the upper-layer CU.

A CU on any layer has an associated PU thereof. The CU is obtained through quadtree division at an increasing depth based on the upper-layer CU. The PU associated with the CU uses a PU associated with the upper-layer CU as reference, and optimal direction prediction of the PU associated with the CU is performed by using the upper-layer CU.

In other words, the direction obtained through completed optimal direction prediction of the PU associated with the upper-layer CU is used as a prediction direction for the PU associated with the CU and that may be selected as an optimal direction.

Figure 5:
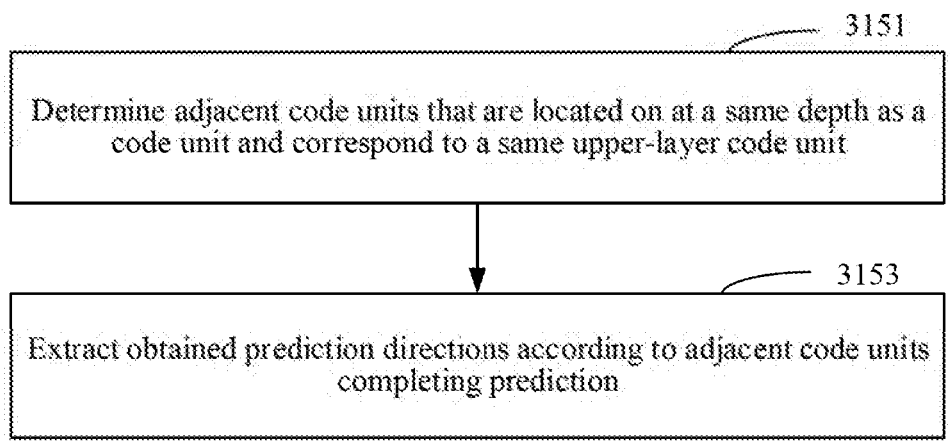
FIG. 5 is a flowchart describing details of step 315 according to the embodiment corresponding to FIG. 4.

In another exemplary embodiment, in step 315, prediction for an optimal direction of the PU is also performed according to adjacent PUs of the PU. Specifically. FIG. 5 is a flowchart describing details of step 315 according to the embodiment corresponding to FIG. 4. Step 315, as shown in FIG. 5, at least includes the following steps.

Step 3151. Determine adjacent CUs that are located at a same depth as the CU and that correspond to a same upper-layer CU.

Step 3153. Extract obtained prediction directions according to adjacent CUs completing prediction. In an exemplary embodiment, step 3153 includes extracting obtained prediction directions according to the adjacent coding units.

As described above, due to corresponding to the same upper-layer CU, the CU and the adjacent CUs thereof have texture consistency. In addition, the CU and the adjacent CUs thereof are adjacent to each other, and have a relatively high similarity. Therefore, adjacency of belonging to the same upper-layer CU may be used for performing optimal direction prediction in the CU that is currently referred to.

Prediction directions obtained through step 315 also become possible directions of encoding prediction performed by the current CU in the PU, and may also be the prediction direction.

Step 317. Construct, by using the prediction direction, the reference direction used by the CU for performing encoding prediction on the PU. In an exemplary embodiment, step 317 includes determining, by using the prediction direction, the reference direction for performing the encoding prediction on the prediction unit The prediction directions obtained by using the upper-layer CU and/or the adjacent CUs are possible directions predicted through encoding prediction performed by the current CU in the PU, and are also used as a basis for determining whether a prediction direction obtained in another dimension is predicted as an optimal direction, to further improve accuracy of prediction for another optimal direction.

Specifically, in the HEVC coding protocol, the adjacent CUs corresponding to the current CU include: a CU located on the top, a CU located on the left, and a CU located on the top left. In all HEVC prediction modes, prediction is performed by using adjacent CUs, and correspondingly, the corresponding optimal direction prediction is also performed according to the adjacent CUs.

In the foregoing exemplary embodiments, reference is provided for optimal direction prediction in image encoding, so that the performed optimal direction prediction is no longer directly obtained from preliminarily selected direction vectors and the like in an excessively simple manner, and directions needing to be analyzed in subsequent optimal selection of directions are effectively and accurately decreased. Therefore, the encoding prediction is strongly targeted, and the limitation of a low encoding speed in image encoding can be directly alleviated.

In another exemplary embodiment, before step 330 is performed, the prediction direction selection method in image encoding further includes the following steps:

obtaining, according to rate-distortion costs in the preselected intra-frame directions, preselected intra-frame directions that have a quantity conforming to a specified quantity and that are arranged in ascending order according to corresponding rate-distortion costs, the obtained preselected intra-frame directions being preliminarily selected direction vectors corresponding to the PU, and the specified quantity being related to a size corresponding to the PU. In an exemplary embodiment, this includes obtaining, according to rate-distortion costs of the intra-frame directions, a specified quantity of the intra-frame directions arranged in ascending order according to corresponding rate-distortion costs, the specified quantity being related to a size corresponding to the prediction unit.

As described above, in the HEVC coding protocol, 35 preselected intra-frame directions are specified. For the encoding prediction performed in the CU for the PU, preliminary selection for the predicted optimal directions are performed on the 35 preselected intra-frame directions.

Herein, it is to be understood that the prediction direction selection in image encoding includes implementation of two parts of prediction direction selection. One part is to perform prediction direction selection related to the upper-layer CU and the adjacent CUs, and in this case, the obtained prediction directions are usually considered as optimally selected directions of an optimal direction; and the other part is preliminary selection among the preselected intra-frame directions.

Selection among the preselected intra-frame directions performed according to rate-distortion costs includes performing preliminary-selection prediction calculation on the 35 preselected intra-frame directions, that is, for example all 35, from 0 to 34, preselected intra-frame directions, by using an evaluation function constructed by introducing a rate-distortion function, to obtain rate-distortion costs corresponding to, for example, all the preselected intra-frame directions.

The rate-distortion costs obtained through the preliminary-selection prediction are arranged in ascending order, and a sorting order of corresponding preselected intra-frame directions in ascending order by rate-distortion costs is obtained according to the obtained sequence of the rate-distortion costs. In the preselected intra-frame directions arranged according to the corresponding rate-distortion costs in ascending order, a specified quantity of preselected intra-frame directions are extracted, to obtain a specified quantity of preselected intra-frame directions having minimum rate-distortion costs, and then to form preliminarily selected direction vectors corresponding to the PU.

The quantity of the preselected intra-frame directions of the formed preliminarily selected direction vectors, that is, the specified quantity, corresponds to a size of the PU. As the size of the PU decreases, the corresponding quantity of preselected intra-frame directions gradually increases until a maximum value is reached. Because in selection among the preselected intra-frame directions, a probability of selecting a preselected intra-frame direction corresponding to a large-size PU is relatively low, a quantity of preselected intra-frame directions that correspond to large-size PUs is smallest, to avoid an unnecessary encoding process. As the size of the PU decreases, a probability that a preselected intra-frame direction of the PU becomes the optimal direction is increased. Therefore, the quantity of the preselected intra-frame directions in the preliminarily selected direction vectors is correspondingly increased.

In a specific implementation of an exemplary embodiment, in a case that a size of a PU is 64×64 pixel blocks or 32×32 pixel blocks, a value corresponding to a specified quantity is 1; in a case that a size of a PU is 16×16 pixel blocks, a value corresponding to a specified quantity is 2; and for a PU having a smaller size, a value corresponding to a specified quantity is 3.

In this way, as preliminary-selection prediction calculation is performed, preliminary selection is implemented among the preselected intra-frame directions, and all preselected intra-frame directions having a possibility of being the optimal direction are selected, to avoid omission. Thereby a subsequent accurate selection process can be performed on preliminarily selected direction vectors including all possibilities of the optimal direction, and ensuring accuracy and reliability of the selection.

Figure 6:
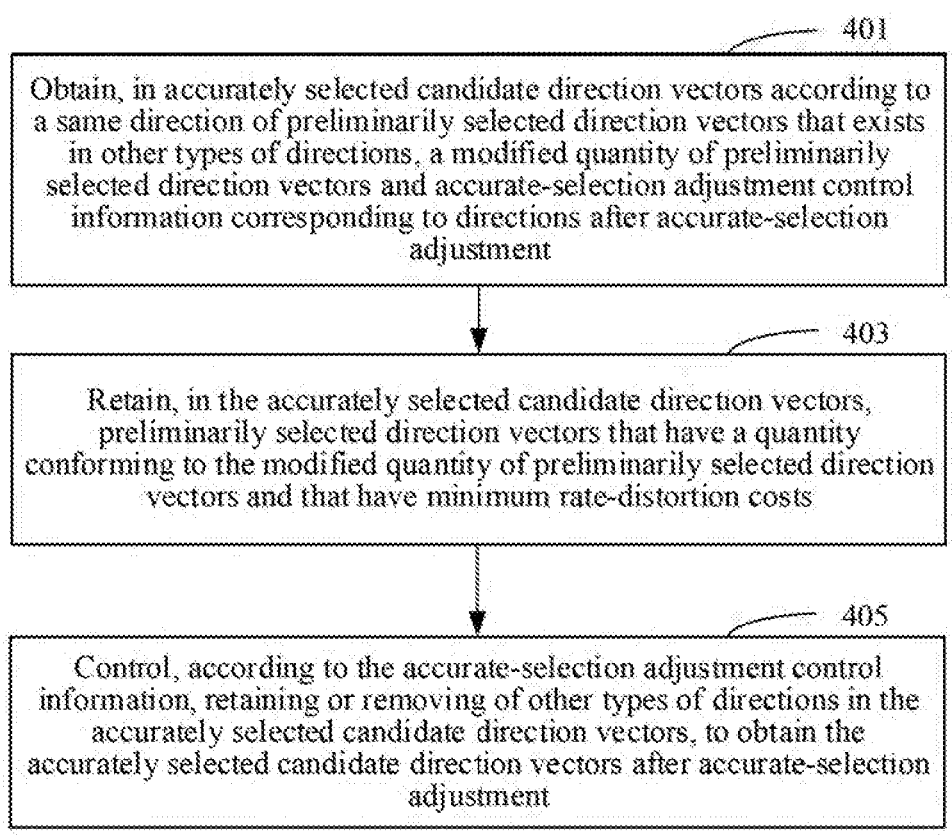
FIG. 6 is a flowchart describing details of a step of modifying a quantity of preliminarily selected direction vectors in accurately selected candidate direction vectors according to the reference direction and intra-frame directions and adjusting accurately selected candidate direction vectors including the modified quantity of preliminarily selected direction vectors according to the embodiment corresponding to FIG. 3.

FIG. 6 is a flowchart describing details of a step of modifying a quantity of preliminarily selected direction vectors in the accurately selected candidate direction vectors according to the reference direction and preselected intra-frame direction vectors and adjusting accurately selected candidate direction vectors including the modified quantity of preliminarily selected direction vectors according to the embodiment corresponding to FIG. 3. The step, as shown in FIG. 6, at least includes the following steps.

Step 401. Obtain, in the accurately selected candidate direction vectors according to a same direction of the preliminarily selected direction vectors that exists in other types of directions, the modified quantity of preliminarily selected direction vectors and accurate-selection adjustment control information corresponding to the directions after accurate-selection adjustment. In an exemplary embodiment, step 401 includes generating, in the accurately selected candidate direction vectors comprising preliminarily selected direction vectors having a same direction as other candidate direction vectors (i.e., reference direction and/or the MPM candidate directions) in the accurately selected candidate direction vectors, the modified quantity of the preliminarily selected direction vectors. Step 401 also includes generating accurate-selection adjustment control information corresponding to adjustment of the accurately selected candidate direction vectors.

Through performing step 310 to step 350, after the accurately selected candidate direction vectors are obtained through construction by using the obtained reference direction, preliminarily selected direction vectors, and even MPM candidate directions, modification of the preliminarily selected direction vectors and adjustment on other types of directions may be performed.

In an exemplary embodiment, modification of a quantity of the preliminarily selected direction vectors is related to: a case that an existing preliminarily selected direction vector is the same as the reference direction and/or the MPM candidate directions, and a size correspondence between the preliminarily selected direction vector and another preliminarily selected direction vector in terms of rate-distortion costs.

Step 403. Retain, in the accurately selected candidate direction vectors, preliminarily selected direction vectors that have a quantity conforming to the modified quantity of preliminarily selected direction vectors and that have minimum rate-distortion costs. In an exemplary embodiment, step 403 includes retaining, in the accurately selected candidate direction vectors, a quantity of the preliminarily selected direction vectors conforming to the modified quantity of the preliminarily selected direction vectors and that have smallest rate-distortion costs.

After the modified quantity of preliminarily selected direction vectors corresponding to the accurately selected candidate direction vectors is obtained, preliminarily selected direction vectors having a quantity conforming to the modified quantity of the preliminarily selected direction vectors may be retained, in the accurately selected candidate direction vectors, in ascending order according to rate-distortion costs. That is, the modified quantity of preliminarily selected direction vectors having minimum rate-distortion costs are retained, and the remaining preliminarily selected direction vectors are removed.

Step 405. Control, according to the accurate-selection adjustment control information, retaining or removing of other types of directions in the accurately selected candidate direction vectors, to obtain the accurately selected candidate direction vectors after accurate-selection adjustment. In an embodiment, step 405 includes controlling, according to the accurate-selection adjustment control information, retaining or removing of the other candidate direction vectors in the accurately selected candidate direction vectors, to obtain the accurately selected candidate direction vectors ater accurate-selection adjustment.

After modification of the quantity of the preliminarily selected direction vectors in the accurately selected candidate direction vectors is completed, the other types of directions existing in the accurately selected candidate direction vectors are retained or removed under control of the accurate-selection adjustment control information, to reduce a quantity of included directions as much as possible while retaining prediction directions having highest possibilities of being the optimal direction.

Accurately selected candidate direction vectors that are obtained through step 405 include the optimal direction of encoding prediction performed by the PU. In addition, code compression of a CU associated with the PU in a TU is also considered, thereby improving an encoding speed and ensuring a high compression rate and high definition.

Figure 7:
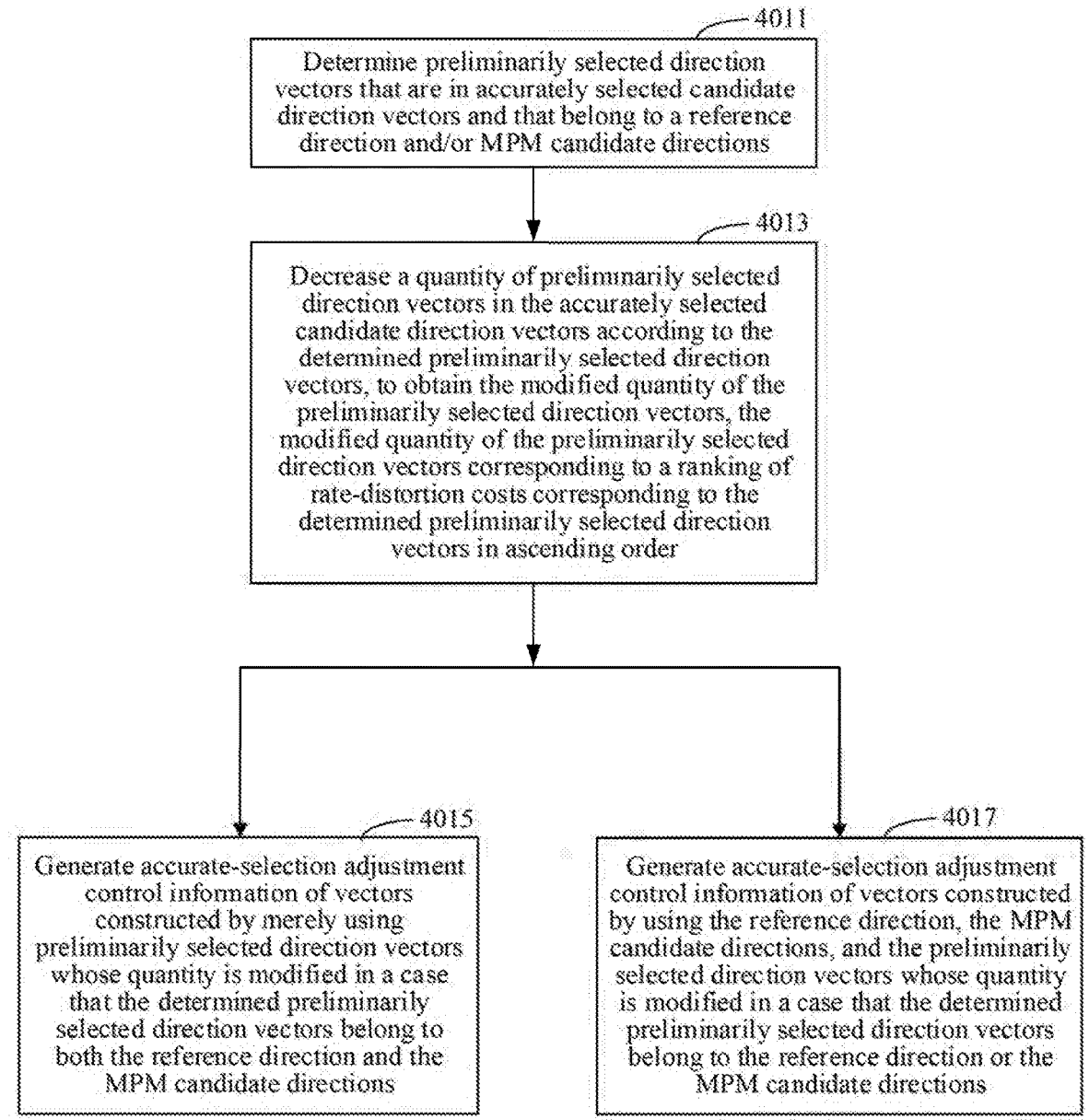
FIG. 7 is a flowchart describing details of step 401 according to the embodiment corresponding to FIG. 6.

FIG. 7 is a flowchart describing details of step 401 according to the embodiment corresponding to FIG. 6. In an exemplary embodiment, the other types of directions include the reference direction and the MPM candidate directions. As shown in FIG. 7, step 401 includes:

Step 4011. Determine preliminarily selected direction vectors that are in the accurately selected candidate direction vectors and that belong to the reference direction and/or the MPM candidate directions. In an exemplary embodiment, step 4011 includes identifying preliminarily selected direction vectors that are in the accurately selected candidate direction vectors and that have a same direction as the reference direction and/or the MPM candidate directions.

Step 4013. Decrease a quantity of preliminarily selected direction vectors in the accurately selected candidate direction vectors according to the determined preliminarily selected direction vectors, to obtain the modified quantity of the preliminarily selected direction vectors, the modified quantity of the preliminarily selected direction vectors corresponding to a ranking of rate-distortion costs corresponding to the determined preliminarily selected direction vectors in ascending order. In an exemplary embodiment, step 4013 includes decreasing a current quantity of preliminarily selected direction vectors in the accurately selected candidate direction vectors according to the identified preliminarily selected direction vectors, to obtain the modified quantity of the preliminarily selected direction vectors. The modified quantity of the preliminarily selected direction vectors corresponds to a ranking of rate-distortion costs corresponding to the identified preliminarily selected direction vectors in ascending order.

Step 4015. Generate accurate-selection adjustment control information of vectors constructed by merely using preliminarily selected direction vectors whose quantity is modified in a case that the determined preliminarily selected direction vectors belong to both the reference direction and the MPM candidate directions. In an exemplary embodiment, step 4015 includes generating the accurate-selection adjustment control information indicating use of only the preliminarily selected direction vectors whose quantity is modified in a case that the identified preliminarily selected direction vectors have a same direction as both the reference direction and the MPM candidate directions.

Step 4017. Generate accurate-selection adjustment control information of vectors constructed by using the reference direction, the MPM candidate directions, and the preliminarily selected direction vectors whose quantity is modified in a case that the determined preliminarily selected direction vectors belong to the reference direction or the MPM candidate directions. In an exemplary embodiment, step 4017 includes generating the accurate-selection adjustment control information indicating use of the reference direction, the MPM candidate directions, and the preliminarily selected direction vectors whose quantity is modified in a case that the identified preliminarily selected direction vectors have a same direction as the reference direction or the MPM candidate directions.

Through performing of step 330, at least one or more preselected intra-frame directions are preliminarily selected for the PU as the preliminarily selected direction vectors. For each of the preliminarily selected direction vectors, whether the preliminarily selected direction vector has a same direction as the reference direction and/or the MPM candidate directions is further determined.

In a case that the preliminarily selected direction vector exists in both the reference direction and the MPM candidate directions, then a quantity of preliminarily selected direction vectors included in outputted accurately selected candidate direction vectors is modified according to a magnitude of a rate-distortion cost corresponding to the preliminarily selected direction vector. For example, in the case that the rate-distortion cost corresponding to the preliminarily selected direction vector is the smallest, or the rate-distortion cost corresponding to the preliminarily selected direction vector being second-smallest, then the modified quantity of the preliminarily selected direction vectors is obtained.

The modification of the quantity of the preliminarily selected direction vectors is an operation decreasing the quantity of the preliminarily selected direction vectors. For example, if the performed modification on the quantity of the preliminarily selected direction vectors causes the quantity of the preliminarily selected direction vectors to be decreased by one, then a previously preliminarily selected direction vector having the largest rate-distortion cost is removed.

Specifically, preliminary-selection prediction calculation is performed on, for example, all the preselected intra-frame directions separately to obtain rate-distortion costs, and the rate-distortion costs are arranged in ascending order, then corresponding arrangement positions 1, 2, . . . , 35 are respectively represented by top1, top2, . . . , top35, and preselected intra-frame directions corresponding to the rate-distortion costs are respectively represented by mode_top1, mode_top2, . . . , mode_top35.

In this case, in a case that a direction mode_top1 corresponding to top1 also exists in the reference direction and the MPM candidate directions, the modified quantity of the preliminarily selected direction vectors is set to 1, and mode_top1 is specified as a prediction direction that is uniquely included in the accurately selected candidate direction vectors. That is, an accurately selected candidate direction vector mode_candidate={mode_top1} is obtained through modification and adjustment.

In a case that a direction mode_top2 corresponding to top2 also exists in the reference direction and the MPM candidate directions, the modified quantity of the preliminarily selected direction vectors is set to 2, and mode_top2 and a direction mode_top1 having a smaller rate-distortion cost relative to mode_top2 are specified as two prediction directions in the accurately selected candidate direction vectors after adjustment. That is, accurately selected candidate direction vectors mode_candidate={mode_top1, mode_top2} are obtained through modification and adjustment.

In this way, for final determination of the accurately selected candidate direction vectors, a modified quantity of the preliminarily selected direction vectors and accurate-selection adjustment control information that are controllable and that accurately provide a most effective set of candidate direction vectors, so that selection of an optimal prediction direction for the PU prediction has a highest probability.

Further, step 401 further includes: generating accurate-selection adjustment control information of vectors constructed by using the reference direction, the MPM candidate directions, and preliminarily selected direction vectors whose quantity is not modified in a case that none of the determined preliminarily selected direction vectors is the same as the reference direction or the MPM candidate directions.

In accurate-selection adjustment performed on the constructed accurately selected candidate direction vectors, a case in which none of the preliminarily selected direction vectors is the same as the reference direction or the MPM candidate directions may also exist. In this case, for the modification on the quantity of the preliminarily selected direction vectors, a basis of modification on the quantity of the preliminarily selected direction vectors no longer exists, and for adjustment that is correspondingly performed on other types of directions, a basis also no longer exists. Therefore, accurate-selection adjustment is not performed, and the reference direction, the MPM candidate directions, and the preliminarily selected direction vectors whose quantity is not modified are directly applied to constructing the accurately selected candidate direction vectors.

Correspondingly, step 405 further includes: retaining or removing the reference direction and the MPM candidate directions in the accurately selected candidate direction vectors according to the accurate-selection adjustment control information, to form the accurately selected candidate direction vectors obtained through adjustment.

As described above, preliminary selection for preselected intra-frame directions is performed on the 35 preselected intra-frame directions to obtain rate-distortion costs corresponding to the preselected intra-frame directions, according to a specified quantity related to a size corresponding to the PU. For example, as described above, in a case that a size of a PU is 64×64 pixel blocks or 32×32 pixel blocks, a quantity of preliminarily selected direction vectors in the accurately selected candidate direction vectors is 1; in a case that a size of a PU is 16×16 pixel blocks, a quantity of preliminarily selected direction vectors in the accurately selected candidate direction vectors is 2; and for a remaining PU having a smaller size, a quantity of preliminarily selected direction vectors in the accurately selected candidate direction vectors is 3.

In this way, modification of a quantity of the preliminarily selected direction vectors will be performed based on the above. During implementation of modification of the quantity of the preliminarily selected direction vectors, it is necessary to consider accuracy of the modification. That is, removed preliminarily selected direction vectors are predicted to have lowest probabilities of being the optimal direction, and the modified quantity of the preliminarily selected direction vectors is based on the size of the PU and the original quantity of the preliminarily selected direction vectors.

Therefore, the modification performed on the preliminarily selected direction vectors adapts to the size of the PU and controls preliminarily selected direction vectors existing in the accurately selected candidate direction vectors to be minimized, and modifies the quantity of the preliminarily selected direction vectors through refinement and accurate selection, thereby ensuring accuracy of modification on the quantity of the preliminarily selected direction vectors.

For example, a first specified size limit is set to 32, and a second specified size limit is set to 16.

A specific value indicating whether a quantity of preliminarily selected direction vectors is modified is determined according to existence of a preliminarily selected direction vector having a same direction as the reference direction or the MPM candidate directions. The value adapts to a size corresponding to the PU.

Once the quantity of the preliminarily selected direction vectors is modified, preliminarily selected direction vectors having the modified quantity of the preliminarily selected direction vectors and corresponding to minimum rate-distortion costs are retained in the accurately selected candidate direction vectors according to the obtained modified quantity of the preliminarily selected direction vectors.

Description is provided in further detail. For a PU having a relatively large size, for example, a PU having a size smaller than 32×32 pixel blocks and larger than 16×16 pixel blocks, a possibility that a corresponding preliminarily selected direction vector that is selected as the optimal direction rapidly decreases as a rate-distortion cost increases. Then, the quantity of the preliminarily selected direction vectors is modified as that of a PU having a largest size, for example, 64×64 pixel blocks. That is, the modified quantity of the preliminarily selected direction vectors is 1, thereby avoiding consumption of a computing resource and reduction of an encoding speed.

For a PU having a small size, for example, a PU having a size smaller than 16×16 pixel blocks, there are still excessively many preliminarily selected direction vectors that exist in the accurately selected candidate direction vectors. Therefore, it is necessary to reduce the quantity as much as possible, to control improvement of an encoding speed.

Correspondingly, in this way, for a PU having a size smaller than 32×32 pixel blocks and larger than 16×16 pixel blocks, an obtained modified quantity of the preliminarily selected direction vectors is 1; and for a PU having a size smaller than 16×16 pixel blocks, an obtained modified quantity of the preliminarily selected direction vectors is 2.

After the modified quantity of the preliminarily selected direction vectors is obtained, preliminarily selected direction vectors that have a quantity conforming to the obtained modified quantity of the preliminarily selected direction vectors and that correspond to the smallest rate-distortion costs are retained in the accurately selected candidate direction vectors.

For example, for a PU, if mode_top1 has a same direction in the reference direction and/or the MPM candidate directions, an obtained modified quantity of the preliminarily selected direction vectors is 1. In this case, a preliminarily selected direction vector corresponding to a smallest rate-distortion cost is retained in the accurately selected candidate direction vectors, that is, the foregoing exemplified mode_top1 is retained.

For another PU, if mode_top2 of the PU has a same direction in the reference direction and/or the MPM candidate directions, then an obtained modified quantity of the preliminarily selected direction vectors is 2. In this case, two preliminarily selected direction vectors corresponding to the smallest rate-distortion costs, that is, the foregoing exemplified mode_top1 and mode_top2, are retained in the accurately selected candidate direction vectors.

In this way, in a case that the preliminarily selected direction vectors merely have a same direction in either of the reference direction and the MPM candidate directions, retained preliminarily selected direction vectors form adjusted accurately selected candidate direction vectors together with the reference direction and the MPM candidate directions.

In a case that the preliminarily selected direction vectors have a same direction in both the two types of directions— the reference direction and the MPM candidate directions— merely the preliminarily selected direction vectors are retained in the accurately selected candidate direction vectors, and the reference direction and the MPM candidate directions are removed.

Through the exemplary embodiment, a quantity of times of calculation that needs to be performed is greatly reduced, thereby significantly improving an encoding speed.

Through the foregoing exemplary embodiment, prediction direction selection in image encoding is implemented. That is, candidate direction vectors of a current PU participating in the accurate selection are constructed according to a reference direction of the PU, candidate directions derived from adjacent blocks, namely, MPM candidate directions, and preliminarily selected direction vectors, so that a quantity of obtained accurately selected candidate direction vectors becomes smaller.

Through the foregoing exemplary embodiment, when a compression rate is slightly decreased, the encoding speed can be significantly improved.

Using image encoding corresponding to an I-frame as an example, an implementation process of prediction direction selection in the foregoing image encoding is described with reference to the I-frame. Herein, the image encoding of the I-frame is performed in an HM encoder, and related encoding prediction thereof is completed through implementation of the present disclosure.

Encoding prediction is performed on a PU of a CU in the image. Herein, prediction direction selection of the PU is performed. A prediction mode corresponding to a selected prediction direction is used for performing encoding prediction of the PU. By extension, encoding prediction of the entire image can be completed.

Specifically, a process of image encoding that is performed by using the HEVC coding protocol includes: transmitting a frame of image into an encoder; obtaining, by the encoder, inputted data corresponding to the frame of image, first obtaining a predicted value through prediction, obtaining a difference between the inputted data and the predicted value to obtain a residual error, and then performing transformation and quantification to obtain a residual coefficient, and finally performing entropy encoding to output a bitstream. At this point, encoding of the image is implemented, then the outputted bitstream may be transmitted to a user side, to provide a corresponding image application service to a user.

In addition, a residual error of a reconstructed image is obtained after inverse quantization and inverse transformation are performed on the residual coefficient, and is added to the predicted value, to obtain the reconstructed image is obtained. After intra-loop filtering is performed on the reconstructed image, a reference frame list is obtained and used as a reference image for a next frame, so that encoding is performed backward frame by frame.

The I-frame is a full-frame-compression coded frame, and is transmitted after code compression is performed on the full-frame image information. Therefore, the performed prediction is implemented through intra prediction.

The prediction direction selection performed on the I-frame includes three parts: the first part is construction of a reference direction; the second part is construction of accurately selected candidate direction vectors; and the third part is modification and adjustment on the accurately selected candidate direction vectors.

(1) Construction of a Reference Direction

An upper-layer CU or adjacent CUs corresponding to the upper-layer CU is/are adaptively selected according to depth information of a current CU, and a prediction direction thereof is recorded, and used for constructing a reference direction for the current CU during prediction on the PU.

The reference direction of the current PU is recorded as mode_ref.

Figure 8:
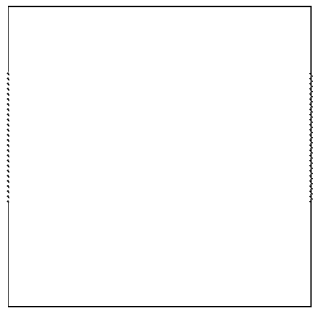
FIG. 8 is a schematic diagram of a CU without being divided into four code subunits according to an exemplary embodiment.

For further description, FIG. 8 is a schematic diagram of a CU that is not divided into four code subunits according to an exemplary embodiment. As shown in FIG. 8, a final prediction direction of related prediction of the CU before the four sub-blocks are divided, that is, before quadtree division, is recorded as mode_up.

For a CU of 64×64 pixel blocks, because the CU is on the top layer, there is no upper-layer CU, and a probability that a PU associated with the CU, that is, a PU of 64×64 pixel blocks, is finally optimally selected is relatively low. Therefore, in subsequently constructed accurately selected candidate direction vectors, there are merely the MPM candidate directions and the preliminarily selected direction vectors.

Starting from a CU of 32×32 pixel blocks, information related to an upper-layer CU and information related to adjacent code subunits belonging to the same upper-layer CU may be obtained. Therefore, in a case that a reference direction is constructed, a first step is to obtain a final prediction direction of PU prediction performed by the upper-layer CU, that is, mode_up.

Figure 9:
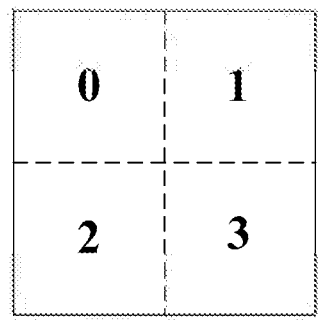
FIG. 9 is a schematic diagram of indexes of relative locations of four code subunits belonging to a same upper-layer CU according to the embodiment corresponding to FIG. 8.

FIG. 9 is a schematic diagram of indexes of relative locations of four code subunits belonging to a same upper-layer CU according to the embodiment corresponding to FIG. 8. The current CU is one of the four code subunits. Values marked in FIG. 9 are used for indicating location coordinates of the code subunits, and are also referred to as indexes of the code subunits.

After mode_up of the upper-layer CU is obtained through the first step, final prediction directions of completed PU prediction of adjacent code subunits are obtained according to the location coordinates shown in FIG. 8, and the final prediction directions that are obtained through PU prediction completed by the four code subunits are recorded as mode_0, mode_1, mode_2, and mode_3.

Specifically, in a case that an index of a current code subunit is 0, a reference direction only includes a final prediction direction of PU prediction performed for the upper-layer CU, that is, mode_ref={mode_up}.

In a case that an index of a current code subunit is 1, a reference direction is a final prediction direction of performed PU prediction of the upper-layer CU and a final prediction direction of PU prediction performed for a code subunit whose index is 0. That is, mode_ref={mode_up, mode_0}.

In a case that an index of a current code subunit is 2, reference directions are: a final prediction direction of performed PU prediction of the upper-layer CU, a final prediction direction of PU prediction performed for a code subunit whose index is 0 and that is used as an adjacent code subunit, and a final prediction direction of PU prediction performed for a code subunit whose index is 1. That is, mode_ref={mode_up, mode_0, mode_1}.

In a case that an index of a current code subunit is 3, reference directions are: a final prediction direction of performed PU prediction of the upper-layer CU, a final prediction direction of performed PU prediction of a code subunit whose index is 0, a final prediction direction of performed PU prediction of a code subunit whose index is 1, and a final prediction direction of performed PU prediction of a code subunit whose index is 2. That is, mode_ref={mode_up, mode_0, mode_1, mode_2}.

(2) Construction of Accurately Selected Candidate Direction Vectors

As described above, for the image of the I-frame, CUs are obtained through quadtree division at different depths, and the CUs each have an associated PU and an associated TU.

Recursive division is performed on the CUs. An HM encoder extracts division modes of PUs and corresponding depth information, to perform a division process of the CUs.

A CU is divided into one or four PUs and a plurality of TUs. For the recursive division of the CU, that is, the performing of quadtree division, a default depth of the CU is 0 to 3, and sizes are 64×64 pixel blocks, 32×32 pixel blocks, 16×16 pixel blocks, and 8×8 pixel blocks. By using a quadtree structure, a CU having a large size is divided into CUs having a small size. The construction of the accurately selected candidate direction vectors generally includes the following three steps:

Step 1: Use SATD as a rate-distortion function, and perform preliminary-selection prediction calculation on for example all 35, 0 to 34, preselected intra-frame directions by using an evaluation function.

The evaluation function is: RDcost=SATD+λ*bit

RDcost is a rate-distortion cost; SATD indicates a used rate-distortion cost function, and a corresponding value is an absolute sum of coefficients after a Hadamard transform is performed on a residual error, a is a Lagrange multiplier, equivalent to a weight; bit is an actual bitstream of encoding, used for indicating an encoding bit rate, and for the performed intra prediction, includes a sum of bits of a mode, a residual error, and the like.

Step 2: Sort RDcost in ascending order, and record an obtained preliminarily selected direction vector as mode_first.

After RDcost is sorted in ascending order, corresponding positions 1, 2, . . . , 35, are respectively represented by using top1, top2, . . . , top35, and corresponding directions thereof are respectively represented by using mode_top1, mode_top2, . . . , mode_top35.

mode_top1 is obtained as a start to extract preliminarily selected direction vectors according to a set quantity of preliminarily selected direction vectors, that is, a specified quantity.

Step 3: Construct accurately selected candidate direction vectors according to the reference direction, the MPM candidate directions, and the preliminarily selected direction vectors, and record the accurately selected candidate direction vectors as mode_candidate.

The MPM candidate directions, as defined in the HEVC coding protocol, are final prediction directions of a PU on the left and a PU on the top and obtained according to an index of a current PU. In a case that neither the PU on the left nor the PU on the top is usable or exists, there is no MPM candidate directions; in a case that either the PU on the left or the PU on the top is usable, there is one MPM candidate direction; and in a case that both the PU on the left and the PU on the top are usable, there are two MPM candidate directions. The MPM candidate direction is recorded as mode_mpm.

If a size of a PU is 64×64 pixel blocks or 32×32 pixel blocks, then a value corresponding to the specified quantity is 1; if a size of a PU is 16×16 pixel blocks, then a value corresponding to the specified quantity is 2; and for the remaining PUs having a smaller size, a value corresponding to the specified quantity is 3. The specified quantity is the quantity of the preliminarily selected direction vectors.

In this case, for a PU of 64×64 pixel blocks, mode_candidate={mode_mpm, mode_top1} is obtained. For a PU of 32×32 pixel blocks, mode_candidate={mode_ref, mode_mpm, mode_top1} is obtained.

For a PU of 16×16 pixel blocks, mode_candidate={mode_ref, mode_mpm, mode_top1, mode_top2} is obtained.

For a PU of 8×8 pixel blocks, mode_candidate={mode_ref, mode_mpm, mode_top1, mode_top2, mode_top3} is obtained.

For a PU of 4×4 pixel blocks, mode_candidate={mode_ref, mode_mpm, mode_top1, mode_top2, mode_top3} is obtained.

(3) Modification and Adjustment on Accurately Selected Candidate Direction Vectors Specifically, in a case that a direction (mode_top1) corresponding to top1 is the same as both the reference direction and the MPM candidate direction, accurate selection is merely performed on one direction, that is, mode_candidate={mode_top1}.

Alternatively, in a case that a direction corresponding to top2 is the same as both the reference direction and the MPM candidate direction, accurate selection is merely performed on two directions, that is, mode_candidate={mode_top1, mode_top2}.

Alternatively, in a case that a size corresponding to a current PU is smaller than 32 pixel blocks, and a direction corresponding to top1 is only the same as one of the reference direction and the MPM candidate direction, a quantity of the preliminarily selected direction vectors is modified to 1. That is, accurate selection is performed on directions corresponding to the reference direction, the MPM candidate direction, and top1.

Alternatively, in a case that a size corresponding to a current PU is smaller than 16 pixel blocks, and a direction corresponding to top2 merely is the same as one of the reference direction and the MPM candidate direction, a quantity of the preliminarily selected direction vectors is modified to 2. That is, accurate selection is performed on directions corresponding to the reference direction, the MPM candidate direction, top1, and top2.

Therefore, accurately selected candidate direction vectors of PU prediction performed in the current CU are enabled to have a high probability of including an optimal direction.

In this way, in a test performed on a plurality of video sequences, during encoding the I-frame, compared with a case before optimization, an encoding speed may be improved by 45%, and a compression rate loss is 0.4%. The speed improvement mainly lies in that a quantity of directions included in an optimal result is decreased, for example, decreasing from more than 10 directions to 1 or 2 directions, thereby also correspondingly decreasing a quantity of cycles of calculation.

Apparatus embodiments of the present disclosure are described below, and may be used for performing the foregoing embodiments of the prediction direction selection method in image encoding of the present disclosure. For details that are not disclosed in the apparatus embodiments of the present disclosure, refer to the embodiments of the prediction direction selection method in image encoding of the present disclosure.

Figure 10:
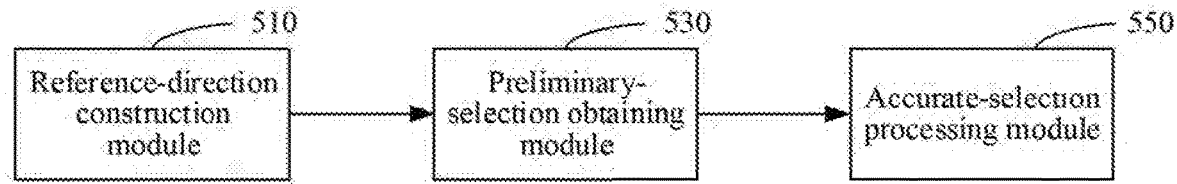
FIG. 10 is a block diagram of a prediction direction selection apparatus in image encoding according to an exemplary embodiment.

FIG. 10 is a block diagram of a prediction direction selection apparatus in image encoding according to an exemplary embodiment. The prediction direction selection apparatus in image encoding, as shown in FIG. 10, includes but is not limited to: a reference-direction construction module 510, a preliminary-selection obtaining module 530, and an accurate-selection processing module 550.

The reference-direction construction module 510 is configured to construct, in encoding prediction initiated for a PU by a CU, a reference direction corresponding to the PU according to texture consistency of the PU relative to an upper-layer CU at which the PU is located. In exemplary embodiments, the reference-direction construction module 510 is configured to determine, in encoding prediction initiated for a prediction unit of a coding unit, a reference direction corresponding to the prediction unit according to texture consistency of the prediction unit relative to an upper-layer coding unit of the coding unit in which the prediction unit is located.

The preliminary-selection obtaining module 530 is configured to obtain, for the CU constructing the reference direction, preliminarily selected direction vectors that are formed from preselected intra-frame directions according to rate-distortion costs. In exemplary embodiments, the preliminary-selection obtaining module 530 is configured to obtain, for the coding unit, preliminarily selected direction vectors that are selected from intra-frame directions according to rate-distortion costs.

The accurate-selection processing module 550 is configured to construct accurately selected candidate direction vectors by using the reference direction and the preliminarily selected direction vectors, the accurately selected candidate direction vectors being used for applying a direction corresponding to an optimal cost as the prediction direction in a case that the CU performs unit prediction. In exemplary embodiments, the accurate-selection processing module 550 is configured to determine accurately selected candidate direction vectors by using the reference direction and the preliminarily selected direction vectors. The accurately selected candidate direction vectors being used for selecting a direction corresponding to an optimal cost as a prediction direction for unit prediction performed for the coding unit.

In another exemplary embodiment, the prediction direction selection apparatus in image encoding further includes an accurate-selection adjustment module.

The accurate-selection adjustment module is configured to modify a quantity of preliminarily selected direction vectors in the accurately selected candidate direction vectors according to the reference direction and the preselected intra-frame directions and adjusting accurately selected candidate direction vectors including the modified quantity of preliminarily selected direction vectors. In an exemplary embodiment, the accurate-selection adjustment module is configured to modify a quantity of the preliminarily selected direction vectors in the accurately selected candidate direction vectors according to the reference direction and the intra-frame directions and adjusting the accurately selected candidate direction vectors comprising the modified quantity of the preliminarily selected direction vectors.

Figure 11:
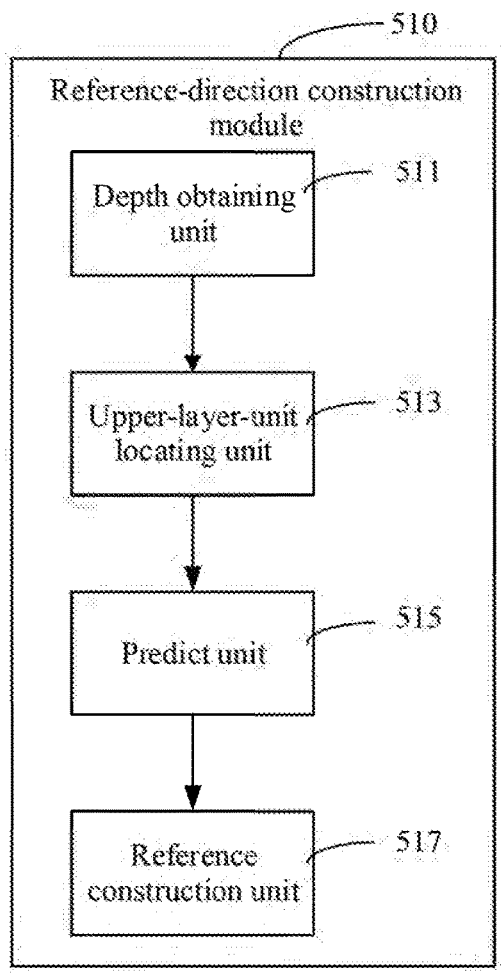
FIG. 11 is a block diagram describing details of a reference-direction construction module according to the embodiment corresponding to FIG. 10.

FIG. 11 is a block diagram describing details of a reference-direction construction module according to the embodiment corresponding to FIG. 10. The reference-direction construction module 510, as shown in FIG. 11, includes but is not limited to: a depth obtaining unit 511, an upper-layer-unit locating unit 513, a predict unit 515, and a reference construction unit 517.

The depth obtaining unit 51 is configured to obtain depth information of a CU.

The upper-layer-unit locating unit 513 is configured to locate the upper-layer CU for the CU according to the depth information.

The predict unit 515 is configured to extract, from the upper-layer CU, a prediction direction that is obtained by an existing PU by completing prediction.

The reference construction unit 517 is configured to construct, by using the prediction direction, the reference direction used by the CU for performing encoding prediction on the PU.

In another exemplary embodiment, the predict unit 515 is further configured to extract a prediction direction that is obtained through encoding prediction that is performed on a PU of the upper-layer CU and that is completed by the upper-layer CU. In an exemplary embodiment, the predict unit 515 is configured to extracting, as the prediction direction, a prediction direction obtained through encoding prediction that is performed on a prediction unit of the upper-layer coding unit.

Figure 12:
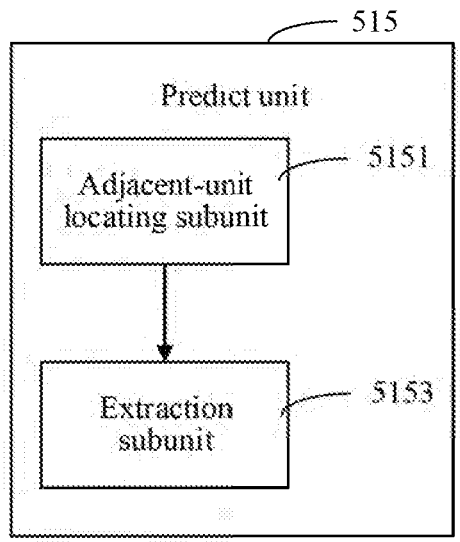
FIG. 12 is a block diagram describing details of a predict unit according to the embodiment corresponding to FIG. 11.

FIG. 12 is a block diagram describing details of a predict unit 515 according to the embodiment corresponding to FIG. 11. The predict unit 515, as shown in FIG. 12, includes but is not limited to: an adjacent-unit locating subunit 5151, and an extraction subunit 5153.

The adjacent-unit locating subunit 5151 is configured to determine adjacent CUs that are located on at a same depth as the CU and that correspond to a same upper-layer CU.

The extraction subunit 5153 is configured to extract obtained prediction directions according to adjacent CUs completing prediction.

In another exemplary embodiment, preliminary-selection obtaining module is further configured to obtain, according to rate-distortion costs in the preselected intra-frame directions, preselected intra-frame directions that have a quantity conforming to a specified quantity and that are arranged in ascending order according to corresponding rate-distortion costs, the obtained preselected intra-frame directions being preliminarily selected direction vectors corresponding to the PU, and the specified quantity being related to a size corresponding to the PU. In an exemplary embodiment, the preliminary-selection obtaining module is configured to obtain, according to rate-distortion costs of the intra-frame directions, a specified quantity of the intra-frame directions arranged in ascending order according to corresponding rate-distortion costs, the specified quantity being related to a size corresponding to the prediction unit.

In another exemplary embodiment, the prediction direction selection apparatus in image encoding further includes an MPM candidate direction obtaining module.

The MPM candidate direction obtaining module is configured to obtain MPM candidate directions of the PU, the MPM candidate directions being used for constructing accurately selected candidate direction vectors of the PU together with a reference direction and the preliminarily selected direction vectors.

Figure 13:
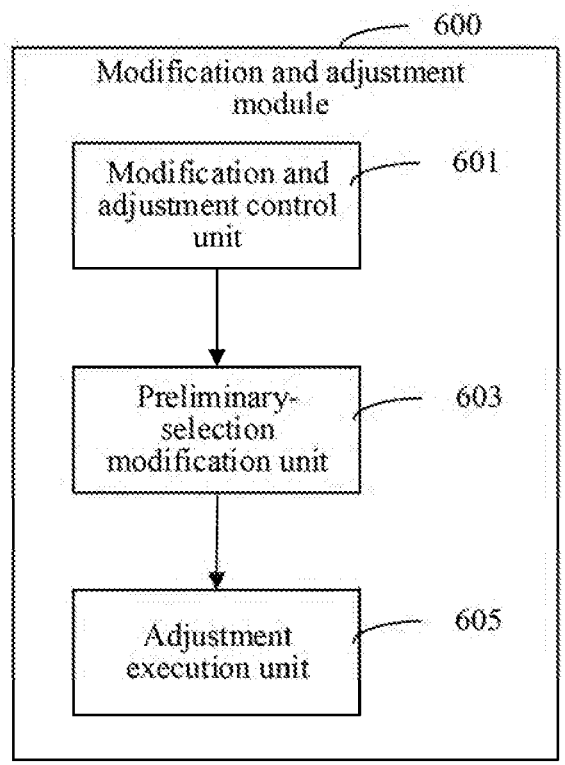
FIG. 13 is a block diagram describing details of an accurate-selection adjustment module according to the embodiment corresponding to FIG. 10.

FIG. 13 is a block diagram describing details of an accurate-selection adjustment module according to the embodiment corresponding to FIG. 10. The modification and adjustment module 600, as shown in FIG. 13, includes but is not limited to: a modification and adjustment control unit 601, a preliminary-selection modification unit 603, and an adjustment execution unit 605.

The modification and adjustment control unit 601 is configured to obtain, in the accurately selected candidate direction vectors according to a same direction of the preliminarily selected direction vectors that exists in other types of directions, the modified quantity of preliminarily selected direction vectors and accurate-selection adjustment control information corresponding to the directions after accurate-selection adjustment. In an exemplary embodiment, the modification and adjustment control unit 601 is configured to generate, in the accurately selected candidate direction vectors comprising preliminarily selected direction vectors having a same direction as other candidate direction vectors in the accurately selected candidate direction vectors, the modified quantity of the preliminarily selected direction vectors. The modification and adjustment control unit 601 is also configured to generate accurate-selection adjustment control information corresponding to adjustment of the accurately selected candidate direction vectors.

The preliminary-selection modification unit 603 is configured to retain, in the accurately selected candidate direction vectors, preliminarily selected direction vectors that have a quantity conforming to the modified quantity of preliminarily selected direction vectors and that have minimum rate-distortion costs. In an exemplary embodiment, the preliminary-selection modification unit 603 is configured to retaining, in the accurately selected candidate direction vectors, a quantity of the preliminarily selected direction vectors conforming to the modified quantity of the preliminarily selected direction vectors and that have smallest rate-distortion costs.

The adjustment execution unit 605 is configured to control, according to the accurate-selection adjustment control information, retaining or removing of other types of directions in the accurately selected candidate direction vectors, to obtain the accurately selected candidate direction vectors after accurate-selection adjustment. In an exemplary embodiment, the adjustment execution unit 605 is configured to control, according to the accurate-selection adjustment control information, retaining or removing of the other candidate direction vectors in the accurately selected candidate direction vectors, to obtain the accurately selected candidate direction vectors after accurate-selection adjustment.

Figure 14:
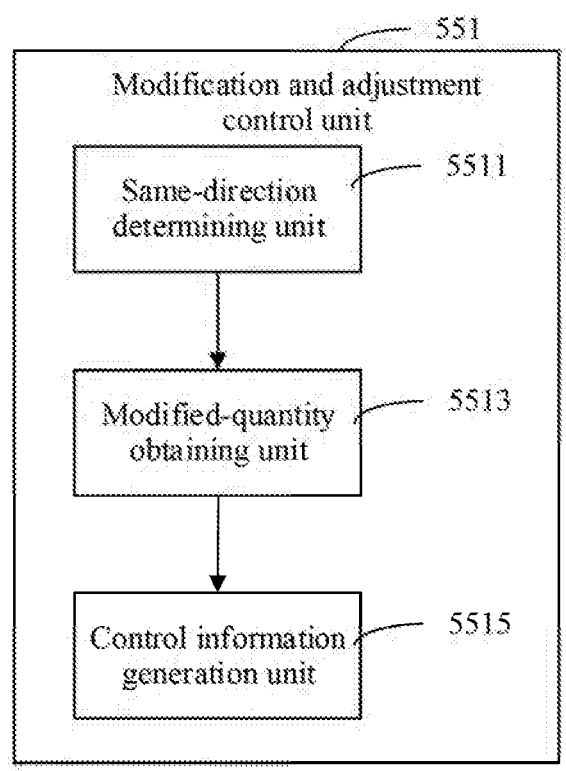
FIG. 14 is a block diagram describing details of a modification and adjustment control unit according to the embodiment corresponding to FIG. 10.

FIG. 14 is a block diagram describing details of a modification and adjustment control unit according to the embodiment corresponding to FIG. 10. In an exemplary embodiment, the other types of directions include the reference direction and the MPM candidate directions. The modification and adjustment control unit 551, as shown in FIG. 14, includes but is not limited to: a same-direction determining unit 5511, a modified-quantity obtaining unit 5513, and a control information generation unit 5515.

The same-direction determining unit 5511 is configured to determine preliminarily selected direction vectors that are in the accurately selected candidate direction vectors and that belong to the reference direction and/or the MPM candidate directions. In an exemplary embodiment, the same-direction determining unit 5511 is configured to identify preliminarily selected direction vectors that are in the accurately selected candidate direction vectors and that have a same direction as the reference direction and/or the MPM candidate directions.

The modified-quantity obtaining unit 5513 is configured to decrease a quantity of preliminarily selected direction vectors in the accurately selected candidate direction vectors according to the determined preliminarily selected direction vectors, to obtain the modified quantity of the preliminarily selected direction vectors, the modified quantity of the preliminarily selected direction vectors corresponding to a ranking of rate-distortion costs corresponding to the determined preliminarily selected direction vectors in ascending order. In an exemplary embodiment, the modified-quantity obtaining unit 5513 is configured to decrease a current quantity of preliminarily selected direction vectors in the accurately selected candidate direction vectors according to the identified preliminarily selected direction vectors, to obtain the modified quantity of the preliminarily selected direction vectors. The modified quantity of the preliminarily selected direction vectors corresponds to a ranking of rate-distortion costs corresponding to the identified preliminarily selected direction vectors in ascending order.

The control information generation unit 5515 is configured to generate accurate-selection adjustment control information of vectors constructed by merely using preliminarily selected direction vectors whose quantity is modified in a case that the determined preliminarily selected direction vectors belong to both the reference direction and the MPM candidate directions. In an exemplary embodiment, the control information generation unit 5515 is configured to generate the accurate-selection adjustment control information indicating use of only the preliminarily selected direction vectors whose quantity is modified in a case that the identified preliminarily selected direction vectors have a same direction as both the reference direction and the MPM candidate directions.

The control information generation unit 5515 is further configured to generate accurate-selection adjustment control information of vectors constructed by using the reference direction, the MPM candidate directions, and the preliminarily selected direction vectors whose quantity is modified in a case that the determined preliminarily selected direction vectors belong to the reference direction or the MPM candidate directions. In an exemplary embodiment, the control information generation unit 5515 is configured to generate the accurate-selection adjustment control information indicating use of the reference direction, the MPM candidate directions, and the preliminarily selected direction vectors whose quantity is modified in a case that the identified preliminarily selected direction vectors have a same direction as the reference direction or the MPM candidate directions.

In another exemplary embodiment, the control information generation unit 5515 is further configured to generate accurate-selection adjustment control information of vectors constructed by using the reference direction, the MPM candidate directions, and the preliminarily selected direction vectors whose quantity is not modified in a case that none of the determined preliminarily selected direction vectors is the same as the reference direction or the MPM candidate directions. In an exemplary embodiment, the control information generation unit 5515 is configured to generate the accurate-selection adjustment control information indicating use of the reference direction, the MPM candidate directions, and the preliminarily selected direction vectors whose quantity is not modified in a case that none of the preliminarily selected direction vectors have a same direction as the reference direction or the MPM candidate directions.

In another exemplary embodiment, the adjustment execution unit 605 is further configured to retain or remove the reference direction and the MPM candidate directions in the accurately selected candidate direction vectors according to the accurate-selection adjustment control information, to form accurately selected candidate direction vectors obtained through adjustment. In an exemplary embodiment, the adjustment execution unit 605 is configured to retain or remove the reference direction and the MPM candidate directions in the accurately selected candidate direction vectors according to the accurate-selection adjustment control information, to form the accurately selected candidate direction vectors after the accurate-selection adjustment.

The present disclosure further provides an electronic device. The electronic device may be applied to the foregoing implementation environment, to perform all or some of the steps in the method shown in any one of FIG. 3, FIG. 4, FIG. 5, FIG. 6, and FIG. 7. The electronic device includes:

a processor, and a memory, configured to store instructions that can be executed by the processor, computer-readable instructions, when executed by the processor, implementing the foregoing steps.

A specific implementation of an operation performed by the processor of the apparatus in this embodiment is described in detail in the embodiments of the foregoing method, and details are not described herein.

In an exemplary embodiment, a storage medium is further provided. The storage medium is a computer-readable storage medium. For example, the storage medium may be a transitory or non-transitory computer-readable storage medium including instructions. The storage medium may be, for example, a memory including instructions, the foregoing instructions may be executed by the processor of the apparatus to complete the foregoing method.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A prediction direction selection method in image encoding, the method comprising:

determining, in encoding prediction initiated for a prediction unit of a coding unit, a reference direction corresponding to the prediction unit according to texture consistency of the prediction unit relative to an upper-layer coding unit of the coding unit in which the prediction unit is located, the reference direction being based on a prediction direction obtained through prediction completed in the upper-layer coding unit;

obtaining, for the coding unit, preliminarily selected direction vectors that are selected from intra-frame directions according to rate-distortion costs;

modifying a quantity of the preliminarily selected direction vectors according to the reference direction based on the prediction direction of the upper-layer coding unit;

generating accurate-selection adjustment control information specifying whether to perform adjustment on other types of directions including the reference direction and most probable mode (MPM) candidate directions; and determining, by processing circuitry of an information processing apparatus, processed candidate direction vectors including the reference direction based on the prediction direction obtained through the prediction completed in the upper-layer coding unit, the accurate-selection adjustment control information, and the modified quantity of the preliminarily selected direction vectors selected according to the rate-distortion costs, the processed candidate direction vectors being used for selecting a direction corresponding to an optimal cost as a prediction direction for unit prediction performed for the coding unit.

2. The method according to claim 1, wherein the obtaining comprises:

selecting, among 35 intra-frame directions defined in High Efficiency Video Coding (HEVC) standard, two or more infra-frame directions having smallest rate-distortion costs according to rate-distortion costs in the prediction unit.

3. The method according to claim 1, wherein after the determining the processed candidate direction vectors including the reference direction and the preliminarily selected direction vectors, the method further comprises:

modifying a quantity of the preliminarily selected direction vectors in the processed candidate direction vectors according to the reference direction and the intra-frame directions and adjusting the processed candidate direction vectors comprising the modified quantity of the preliminarily selected direction vectors.

4. The method according to claim 3, wherein the determining the reference direction comprises:

obtaining depth information of the coding unit;

locating the upper-layer coding unit of the coding unit according to the depth information;

extracting, from the upper-layer coding unit, the prediction direction obtained through prediction completed for a prediction unit existing in the upper-layer coding unit; and determining, by using the prediction direction, the reference direction for performing the encoding prediction on the prediction unit.

5. The method according to claim 4, wherein the extracting comprises:

extracting, as the prediction direction, a prediction direction obtained through encoding prediction that is performed on the prediction unit of the upper-layer coding unit.

6. The method according to claim 4, wherein the extracting comprises:

determining adjacent coding units that are located at a same depth as the coding unit and correspond to the upper-layer coding unit; and extracting obtained prediction directions according to the adjacent coding units.

7. The method according to claim 6, wherein the adjacent coding units comprise a coding unit located on top of the coding unit, a coding unit located left of the coding unit, and a coding unit located on top left of the coding unit.

8. The method according to claim 1, wherein the obtaining comprises:

obtaining, according to rate-distortion costs of the intra-frame directions, a specified quantity of the intra-frame directions arranged in ascending order according to corresponding rate-distortion costs, the specified quantity being related to a size corresponding to the prediction unit.

9. The method according to claim 8, wherein the specified quantity separately corresponds to a specific value according to the size corresponding to the prediction unit; and as the size corresponding to the prediction unit decreases, the specified quantity of the intra-frame directions gradually increases until a maximum value is reached.

10. The method according to claim 1, wherein, before the determining the processed candidate direction vectors, the method further comprises:

obtaining most the MPM candidate directions of the prediction unit, the MPM candidate directions being included in the processed candidate direction vectors of the prediction unit together with the reference direction and the preliminarily selected direction vectors.

11. The method according to claim 3, wherein the modifying the quantity of the preliminarily selected direction vectors comprises:
generating, in the processed candidate direction vectors comprising preliminarily selected direction vectors having a same direction as other candidate direction vectors in the processed candidate direction vectors, the modified quantity of the preliminarily selected direction vectors and generating the accurate-selection adjustment control information corresponding to adjustment of the processed candidate direction vectors;
retaining, in the processed candidate direction vectors, a quantity of the preliminarily selected direction vectors conforming to the modified quantity of the preliminarily selected direction vectors and that have smallest rate-distortion costs; and
controlling, according to the accurate-selection adjustment control information, retaining or removing of the other candidate direction vectors in the processed candidate direction vectors, to obtain the processed candidate direction vectors after accurate-selection adjustment.

12. The method according to claim 11, wherein the other candidate direction vectors in the processed candidate direction vectors comprise the reference direction and the most probable mode (MPM) candidate directions, and the generating the modified quantity of the preliminarily selected direction vectors and the generating the accurate-selection adjustment control information comprises:
identifying preliminarily selected direction vectors that are in the processed candidate direction vectors and that have a same direction as the reference direction and/or the MPM candidate directions;
decreasing a current quantity of preliminarily selected direction vectors in the processed candidate direction vectors according to the identified preliminarily selected direction vectors, to obtain the modified quantity of the preliminarily selected direction vectors, the modified quantity of the preliminarily selected direction vectors corresponding to a ranking of rate-distortion costs corresponding to the identified preliminarily selected direction vectors in ascending order;
generating the accurate-selection adjustment control information indicating use of only the preliminarily selected direction vectors whose quantity is modified in a case that the identified preliminarily selected direction vectors have a same direction as both the reference direction and the MPM candidate directions, or
generating the accurate-selection adjustment control information indicating use of the reference direction, the MPM candidate directions, and the preliminarily selected direction vectors whose quantity is modified in a case that the identified preliminarily selected direction vectors have a same direction as the reference direction or the MPM candidate directions.

13. The method according to claim 12, wherein the other candidate direction vectors comprise the reference direction and the MPM candidate directions, and the generating the modified quantity of the preliminarily selected direction vectors and the generating the accurate-selection adjustment control information further comprises:
generating the accurate-selection adjustment control information indicating use of the reference direction, the MPM candidate directions, and the preliminarily selected direction vectors whose quantity is not modified in a case that none of the preliminarily selected direction vectors have a same direction as the reference direction or the MPM candidate directions.

14. The method according to claim 12, wherein the controlling, according to the accurate-selection adjustment control information, the retaining or removing of the other candidate direction vectors comprises:
retaining or removing the reference direction and the MPM candidate directions in the processed candidate direction vectors according to the accurate-selection adjustment control information, to form the processed candidate direction vectors after the accurate-selection adjustment.

15. The method according to claim 1, wherein the rate-distortion costs are obtained by using a sum of absolute transformed differences (STAD) rate-distortion cost function.

16. A prediction direction selection apparatus, the apparatus comprising:
processing circuitry configured to
determine, in encoding prediction initiated for a prediction unit of a coding unit, a reference direction corresponding to the prediction unit according to texture consistency of the prediction unit relative to an upper-layer coding unit of the coding unit in which the prediction unit is located, the reference direction being based on a prediction direction obtained through prediction completed in the upper-layer coding unit;
obtain, for the coding unit, preliminarily selected direction vectors that are selected from intra-frame directions according to rate-distortion costs;
modify a quantity of the preliminarily selected direction vectors according to the reference direction based on the prediction direction of the upper-laver coding unit;
generate accurate-selection adjustment control information specifying whether to perform adjustment on other types of directions including the reference direction and most probable mode (MPM) candidate directions; and
determine processed candidate direction vectors including the reference direction based on the prediction direction obtained through the prediction completed in the upper-layer coding unit, the accurate-selection adjustment control information, and the modified quantity of the preliminarily selected direction vectors selected according to the rate-distortion costs,
the processed candidate direction vectors being used for selecting a direction corresponding to an optimal cost as a prediction direction for unit prediction performed for the coding unit.

17. The apparatus according to claim 16, wherein the processing circuitry is further configured to
modify a quantity of the preliminarily selected direction vectors in the processed candidate direction vectors according to the reference direction and the intra-frame directions and adjusting the processed candidate direction vectors comprising the modified quantity of the preliminarily selected direction vectors.

18. The apparatus according to claim 16, wherein the rate-distortion costs are obtained by using a sum of absolute transformed differences (STAD) rate-distortion cost function.

19. An electronic device, comprising:
a processor; and
a memory, the memory storing computer-readable instructions, and the computer-readable instructions, when executed by the processor, cause the processor to perform the method according to claim 1.

20. A non-transitory computer-readable storage medium, storing instructions, which when executed by at least one processor, cause the at least one processor to perform:
- determining, in encoding prediction initiated for a prediction unit of a coding unit, a reference direction corresponding to the prediction unit according to texture consistency of the prediction unit relative to an upper-layer coding unit of the coding unit in which the prediction unit is located, the reference direction being based on a prediction direction obtained through prediction completed in the upper-layer coding unit;
- obtaining, for the coding unit, preliminarily selected direction vectors that are selected from infra-frame directions according to rate-distortion costs;
- modifying a quantity of the preliminarily selected direction vectors according to the reference direction based on the prediction direction of the upper-layer coding unit;
- generating accurate-selection adjustment control information specifying whether to perform adjustment on other types of directions including the reference direction and most probable mode (MPM) candidate directions; and
- determining processed candidate direction vectors including the reference direction based on the prediction direction obtained through the prediction completed in the upper-layer coding unit, the accurate-selection adjustment control information, and the modified quantity of the preliminarily selected direction vectors selected according to the rate-distortion costs,
- the processed candidate direction vectors being used for selecting a direction corresponding to an optimal cost as a prediction direction for unit prediction performed for the coding unit.

* * * * *